(12) United States Patent
Kinoshita et al.

(10) Patent No.: US 12,138,855 B2
(45) Date of Patent: *Nov. 12, 2024

(54) FORMING APPARATUS AND METHOD OF PRODUCING FORMED BODY

(71) Applicant: LG Chem, Ltd., Seoul (KR)

(72) Inventors: Yoshihiro Kinoshita, Tokyo (JP); Eiichiro Narimatsu, Tokyo (JP)

(73) Assignee: LG Chem, Ltd., Seoul (KR)

( * ) Notice: Subject to any disclaimer, the term of this patent is extended or adjusted under 35 U.S.C. 154(b) by 416 days.

This patent is subject to a terminal disclaimer.

(21) Appl. No.: 17/273,578

(22) PCT Filed: Dec. 24, 2019

(86) PCT No.: PCT/KR2019/018381
§ 371 (c)(1),
(2) Date: Mar. 4, 2021

(87) PCT Pub. No.: WO2020/138906
PCT Pub. Date: Jul. 2, 2020

(65) Prior Publication Data
US 2021/0331386 A1    Oct. 28, 2021

(30) Foreign Application Priority Data
Dec. 25, 2018 (JP) .................. 2018-240882

(51) Int. Cl.
*B33Y 10/00* (2015.01)
*B29C 64/165* (2017.01)
(Continued)

(52) U.S. Cl.
CPC .......... *B29C 64/165* (2017.08); *B29C 64/205* (2017.08); *B29C 64/232* (2017.08);
(Continued)

(58) Field of Classification Search
None
See application file for complete search history.

(56) References Cited

U.S. PATENT DOCUMENTS

| | | | |
|---|---|---|---|
| 6,122,564 A | 9/2000 | Koch et al. | |
| 8,329,084 B2 | 12/2012 | Beugels et al. | |

(Continued)

FOREIGN PATENT DOCUMENTS

| | | | |
|---|---|---|---|
| CN | 104190933 A | 12/2014 | |
| CN | 105499564 A | 4/2016 | |

(Continued)

OTHER PUBLICATIONS

Search Report dated Apr. 25, 2022 from Office Action for Chinese Application No. 201980055420 issued May 5, 2022. 3 pgs.

(Continued)

*Primary Examiner* — Yung-Sheng M Tsui
(74) *Attorney, Agent, or Firm* — Lerner David LLP

(57) ABSTRACT

A method and apparatus for producing a three-dimensional body are disclosed herein. The apparatus is capable of producing an inorganic material-containing formed body having improved quality. In some embodiments, the apparatus includes a stage, a supply unit configured to intermittently or continuously supply a composition to a stage, the composition containing an inorganic material, a heating unit including a thermal solidification heat source configured to perform at least thermal solidification on the composition, an information acquisition unit configured to acquire information on at least one among the geometric state, physical state, and chemical state of the thermally solidified composition, and a control unit configured to control the supply unit and the heating unit to repeat supply and thermal solidification of the composition, and to control the supply unit and the heating unit based on the acquired information.

6 Claims, 11 Drawing Sheets

(51) Int. Cl.

| | | |
|---|---|---|
| *B29C 64/205* | (2017.01) | |
| *B29C 64/232* | (2017.01) | |
| *B29C 64/268* | (2017.01) | |
| *B29C 64/277* | (2017.01) | |
| *B29C 64/295* | (2017.01) | |
| *B29C 64/336* | (2017.01) | |
| *B29C 64/393* | (2017.01) | |
| *B33Y 30/00* | (2015.01) | |
| *B33Y 50/02* | (2015.01) | |
| *B33Y 70/10* | (2020.01) | |

(52) U.S. Cl.
CPC .......... *B29C 64/268* (2017.08); *B29C 64/277* (2017.08); *B29C 64/295* (2017.08); *B29C 64/336* (2017.08); *B29C 64/393* (2017.08); *B33Y 10/00* (2014.12); *B33Y 30/00* (2014.12); *B33Y 50/02* (2014.12); *B33Y 70/10* (2020.01)

(56) References Cited

U.S. PATENT DOCUMENTS

| | | | |
|---|---|---|---|
| 10,843,263 B2 | 11/2020 | Cha et al. | |
| 10,898,951 B2 | 1/2021 | Muto et al. | |
| 10,921,782 B2 | 2/2021 | Mehr et al. | |
| 2004/0173946 A1* | 9/2004 | Pfeifer | B22F 12/90 |
| | | | 219/121.6 |
| 2007/0145629 A1* | 6/2007 | Ebert | B29C 64/153 |
| | | | 264/157 |
| 2010/0162458 A1 | 7/2010 | Beugels et al. | |
| 2016/0040025 A1* | 2/2016 | Norikane | C09D 101/286 |
| | | | 106/206.1 |
| 2016/0101470 A1 | 4/2016 | Kamakura | |
| 2016/0311027 A1 | 10/2016 | Shimoyama | |
| 2016/0368053 A1 | 12/2016 | Kamakura | |
| 2017/0056974 A1 | 3/2017 | Miyashita et al. | |
| 2017/0066193 A1 | 3/2017 | Kim et al. | |
| 2017/0120376 A1* | 5/2017 | Cheverton | B29C 64/393 |
| 2017/0157850 A1 | 6/2017 | Duan et al. | |
| 2017/0225392 A1 | 8/2017 | Beak et al. | |
| 2017/0326867 A1* | 11/2017 | Hartke | B29C 64/153 |
| 2018/0009165 A1 | 1/2018 | Agawa | |
| 2018/0085997 A1* | 3/2018 | Tsunoya | B33Y 70/00 |
| 2018/0154577 A1 | 6/2018 | Lee | |
| 2018/0186073 A1 | 7/2018 | Dial et al. | |
| 2018/0243977 A1* | 8/2018 | Meinders | B22F 10/38 |
| 2018/0264726 A1 | 9/2018 | Shiomi et al. | |
| 2018/0281062 A1 | 10/2018 | Cha et al. | |
| 2020/0062978 A1 | 2/2020 | Miyashita et al. | |
| 2021/0101332 A1* | 4/2021 | Kawanaka | B29C 64/393 |
| 2021/0197280 A1* | 7/2021 | Kasperchik | B22F 10/16 |
| 2022/0016707 A1* | 1/2022 | John | C04B 35/4885 |

FOREIGN PATENT DOCUMENTS

| | | | | |
|---|---|---|---|---|
| CN | 106256463 A | 12/2016 | | |
| CN | 106475557 A | 3/2017 | | |
| CN | 107584760 A | 1/2018 | | |
| CN | 107614244 A | 1/2018 | | |
| CN | 107671288 A | 2/2018 | | |
| JP | 2003305777 A | 10/2003 | | |
| JP | 2011167768 A | 9/2011 | | |
| JP | 2015085547 A | 5/2015 | | |
| JP | 2015-178192 A | 10/2015 | | |
| JP | 2017532204 A | 11/2017 | | |
| JP | 2018122524 A | 8/2018 | | |
| JP | 2018141224 A | 9/2018 | | |
| JP | 2018-153935 A | 10/2018 | | |
| KR | 20080110843 A | 12/2008 | | |
| KR | 20160018910 A | 2/2016 | | |
| KR | 20170028746 A | 3/2017 | | |
| KR | 20170040060 A | 4/2017 | | |
| KR | 101912311 B1 | 10/2018 | | |
| KR | 20180114593 A | 10/2018 | | |
| KR | 20180121762 A | 11/2018 | | |
| WO | WO-2015181247 A1 * | 12/2015 | ............ | B22F 3/1055 |
| WO | 2017099250 A1 | 6/2017 | | |
| WO | 2018217903 A1 | 11/2018 | | |

OTHER PUBLICATIONS

International Search Report for PCT/KR2019/018381 mailed Apr. 7, 2020; 2 pages.

* cited by examiner

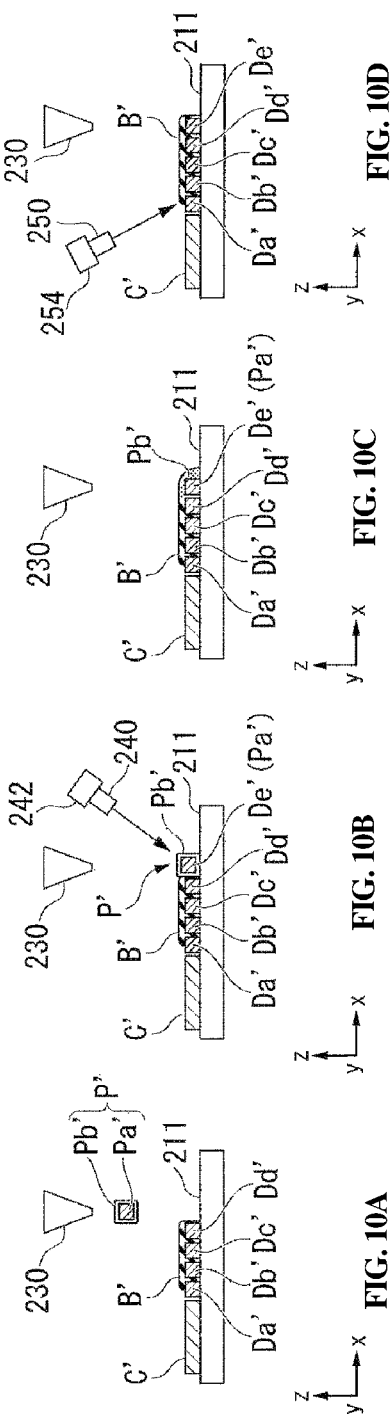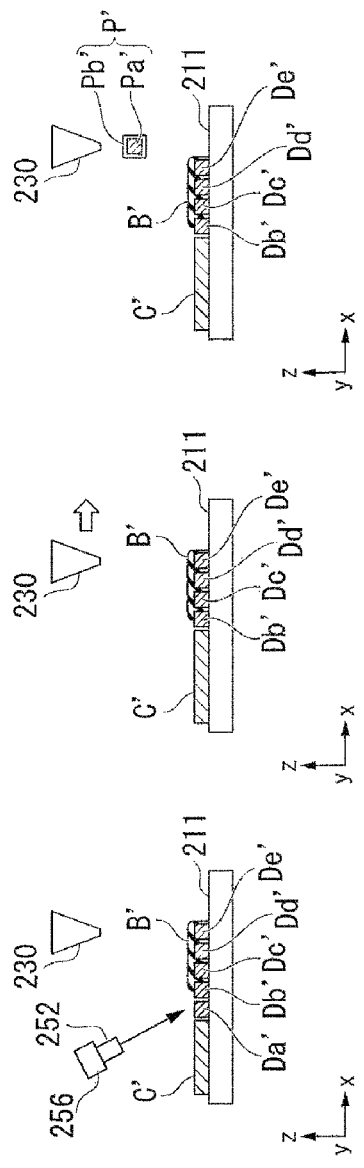

FORMING APPARATUS AND METHOD OF PRODUCING FORMED BODY

CROSS-REFERENCE TO RELATED APPLICATION(S)

The present application is a national phase entry under 35 U.S.C. § 371 of International Application No. PCT/KR2019/018381, filed on Dec. 24, 2019, which claims priority from Japanese Patent Application No. 2018-240882, filed on Dec. 25, 2018, the disclosures of which are incorporated herein by reference.

TECHNICAL FIELD

The present disclosure relates to a forming apparatus and a method of producing a formed body.

BACKGROUND ART

In recent years, three-dimensional prototyping techniques that use no mold have been developed to perform shaping of inorganic materials such as metals or metal oxides so as to have any three-dimensional shape.

Stereolithography, which is a typical three-dimensional prototyping technique for inorganic materials, is disclosed in Japanese Patent No. 4800074 (Patent Document 1) and the like. In stereolithography, a forming apparatus includes: a liquid tank for accommodating a liquid precursor which inorganic particles are dispersed in a liquid photocurable composition; a stage provided liftably in the liquid tank; and a light source that irradiates light for curing the photocurable composition from the upper side of the liquid tank.

The stage is set at a position slightly below the liquid level of the liquid precursor, and a first layer is cured by irradiating light in a predetermined first layer pattern to the liquid precursor located on the stage. After curing the precursor of the first layer according to a predetermined pattern, the uncured liquid precursor of the first layer is washed out (washing process). Next, the stage is descended slightly, and a second layer immediately above the first layer is cured by irradiating light in a predetermined second layer pattern. As such an operation is repeated, the precursor for each layer from the first layer to the uppermost layer is cured, thereby forming a formed body having a predetermined three-dimensional shape, which is composed of a plurality of layers.

The obtained formed body is composed of a cured photocurable composition and inorganic particles dispersed therein. Solvent extraction or heat treatment on this formed body is performed, and thus the photocurable composition is degreased and the organic material component in the formed body is removed (degreasing process). Further, after degreasing, the formed body composed of inorganic particles is baked at high temperature, so that the inorganic particles in the formed body are sintered (sintering process), thereby obtaining an inorganic material formed body having a predetermined three-dimensional shape.

However, in this stereolithography, when the three-dimensional shape becomes complex, the washing process becomes difficult to perform, the time required for the washing process also increases, and in some cases, sufficient washing can be impossible according to the shape, and as a result, deterioration in the quality of the formed body can occur. In the degreasing process, in particular, when the three-dimensional shape is complex, the organic material component or its decomposed component cannot be sufficiently removed and can remain in the formed body, and thus deterioration in the quality of the formed body can occur due to such insufficient removal. Further, since the organic material component is removed by degreasing, a gap corresponding to the volume of the removed organic material component is formed in the formed body, and the entire formed body can be compressed by the size of this gap by sintering, so that the dimensions of the finished formed body become smaller than the assumed dimensions. As a result, the dimensional accuracy of the formed body cannot satisfy the required quality. Further, in the sintering process, defects, such as cracks or damage, can occur in the formed body after sintering due to the difference in coefficient of thermal expansion between portions of the formed body, and thus the quality of the formed body cannot be ensured. For this reason, improvement in the quality of the formed body produced by a forming apparatus has been required.

PRIOR ART DOCUMENT

Patent Document (Patent Document 1): Japanese Patent No. 4800074

DISCLOSURE

Technical Problem

An object of the present disclosure is to provide a forming apparatus capable of producing an inorganic material-containing formed body having improved quality.

Technical Solution

One aspect of the present disclosure is a forming apparatus for three-dimensional shaping, including a stage, a supply unit configured to intermittently or continuously supply a composition containing an inorganic material to the stage, a heating unit including a thermal solidification heat source configured to perform at least thermal solidification on the stage with respect to the composition supplied from the supply unit, an information acquisition unit configured to acquire information on at least one among the geometric state, physical state, and chemical state of the thermally solidified composition, and a control unit configured to control the supply unit and the heating unit to repeat the supply and thermal solidification of the composition, and to control the supply unit and the heating unit based on the acquired information.

In the forming apparatus according to the aspect, the control unit can control the supply unit and the heating unit to repeat supply and thermal solidification of the composition at least along a surface of the stage.

In the forming apparatus according to the aspect, the control unit can control a position of the supply unit and a position of the heating unit relative to the stage, based on the acquired information.

In the forming apparatus according to the aspect, the control unit can control the supply unit and the heating unit to repeatedly perform the supply and thermal solidification of the composition at least within the same plane.

In the forming apparatus according to the aspect, the supply unit can include a first supplier configured to intermittently or continuously supply a first composition containing a first inorganic material to the stage, and a second supplier configured to intermittently or continuously supply a second composition to the stage, wherein the second composition containing a second inorganic material different from the first inorganic material. Further, the heating unit can include a first thermal solidification heat source configured to perform at least thermal solidification of the first composition on the stage, and a second thermal solidification heat source configured to perform at least thermal solidification of the second composition on the stage.

In the forming apparatus according to the aspect, the information acquisition unit can have a photographing device configured to photograph the thermally solidified composition on the stage, the information acquisition unit can acquire information on the geometric state of the thermally solidified composition, based on photographed data obtained from the photographing device, and the control unit can control a position of the supply unit and a position of performing the heating unit relative to the stage, based on the acquired information on the geometric state of the thermally solidified composition.

In the forming apparatus according to the aspect, the information acquisition unit can have an ultrasonic device configured to acquire the information, and the ultrasonic device can be configured to transmit ultrasonic waves toward the thermally solidified composition on the stage and to receive the reflected ultrasonic waves. Further, the forming apparatus for three-dimensional shaping can include a removal unit configured to remove at least a portion of the thermally solidified composition from the stage, the information acquisition unit can acquire information on the geometric state or physical state of the thermally solidified composition, based on data obtained from the ultrasonic device, and the control unit can control the removal unit to remove the at least a portion of the thermally solidified composition on the stage from the stage, based on the acquired information on the geometric state or physical state of the thermally solidified composition.

In the forming apparatus according to the aspect, the information acquisition unit can have an X-ray diffraction device configured to acquire the information, and the X-ray diffraction device can be configured to measure an X-ray diffracted pattern of the thermally solidified composition on the stage. Further, the information acquisition unit can acquire information on the physical state or chemical state of the thermally solidified composition, based on the X-ray diffracted pattern measured by the X-ray diffraction device, and the control unit can control the heating unit to reheat the thermally solidified composition on the stage, based on the acquired information on the physical state or chemical state of the thermally solidified composition.

In the forming apparatus according to the aspect, the composition can contain an organic binder in which the inorganic material has been dispersed or an organic coating surrounding the inorganic material, the heating unit can further include a degreasing heat source configured to degrease the organic binder or the organic coating by heating the composition, and the control unit can control the degreasing heat source to perform the degreasing before the thermal solidification of the composition by the thermal solidification heat source.

The forming apparatus according to the aspect can further include an immobilization unit configured to immobilize the composition on the stage prior to thermal solidification of the composition. Further, the composition can contain an organic binder containing a photocurable composition, and the immobilization unit can include a light source configured to photocure the photocurable composition before thermal solidification of the composition by the heating unit. Alternatively, the composition can contain an inorganic particle coated with an organic coating, and the immobilization unit can include a melting heat source configured to thermally melt the organic coating before thermal solidification of the composition by the heating unit.

Another aspect of the present disclosure is a method of producing a three-dimensional formed body from a composition containing an inorganic material, the method including (a) supplying the composition from a supply unit to a stage intermittently or continuously, (b) thermal solidifying the composition on the stage using a heating unit to form a thermally solidified composition, (c) acquiring information on at least one among the geometric state, physical state, and chemical state of the thermally solidified composition, and controlling the supply unit and the heating unit, based on the acquired information, (d) repeating steps (a) to (c) to form a three-dimensional formed body.

In the method of producing the formed body according to the aspect, step (d) occurs at least along the surface of the stage.

In the method of producing the formed body according to the aspect, the supplying and the performing of the thermal solidification can be repeatedly executed at least within the same plane.

The method of producing the formed body according to the aspect can further include (e) moving the stage in a direction orthogonal to the surface of the stage after step (b), and wherein step (d) comprises repeating steps (a) to (c), and (e) to from the three-dimensional formed body.

The controlling can include a process of determining a position of the supply unit and a position of the heating unit relative to the stage, based on the acquired information.

The method of producing the formed body according to the aspect can include, in step (a), supplying a first composition intermittently or continuously from the supply unit to the stage, wherein the first composition containing a first inorganic material, and supplying a second composition intermittently or continuously from the supply unit to the stage, wherein the second composition containing a second inorganic material different from the first inorganic material. Further, the method of producing the formed body according to the aspect can include, in step (b), thermally solidifying the first composition using the heating unit, and thermally solidifying the second composition using the heating unit.

In the method of producing the formed body according to the aspect, step (c) can include acquiring information on the arrangement or shape of the thermally solidified composition by photographing the thermally solidified composition on the stage using a photographing device, and controlling a position of the supply unit and a position of the heating unit, based on the information on the arrangement or shape of the thermally solidified composition.

In the method of producing the formed body according to the aspect, step (c) can include acquiring information on the density of the thermally solidified composition by transmitting ultrasonic waves toward the thermally solidified composition and receiving the reflected ultrasonic waves with an ultrasonic device, and controlling a position of the supply unit and a position of the heating unit, based on the acquired information on the density of the composition.

In the method of producing the formed body according to the aspect, step (c) can include acquiring information on the crystallinity of the thermally solidified composition by measuring an X-ray diffracted pattern of the thermally solidified composition with an X-ray diffraction device, and controlling the heating unit to reheat the thermally solidified composition on the stage, based on the acquired information on the crystallinity of the composition.

Still another aspect of the present disclosure is a forming apparatus for three-dimensional shaping, including a stage, a supply unit configured to intermittently or continuously supply a composition containing an inorganic material to the stage, a heating unit including a thermal solidification heat source configured to perform at least thermal solidification of the composition on the stage, and a control unit configured to control the supply unit and the heating unit to repeat, at least along the stage, supply and thermal solidification of the composition.

DESCRIPTION OF DRAWINGS

FIGS. 10A to 10G depict steps of a method of producing a formed body by the forming apparatus of the third embodiment.

Figure 1:
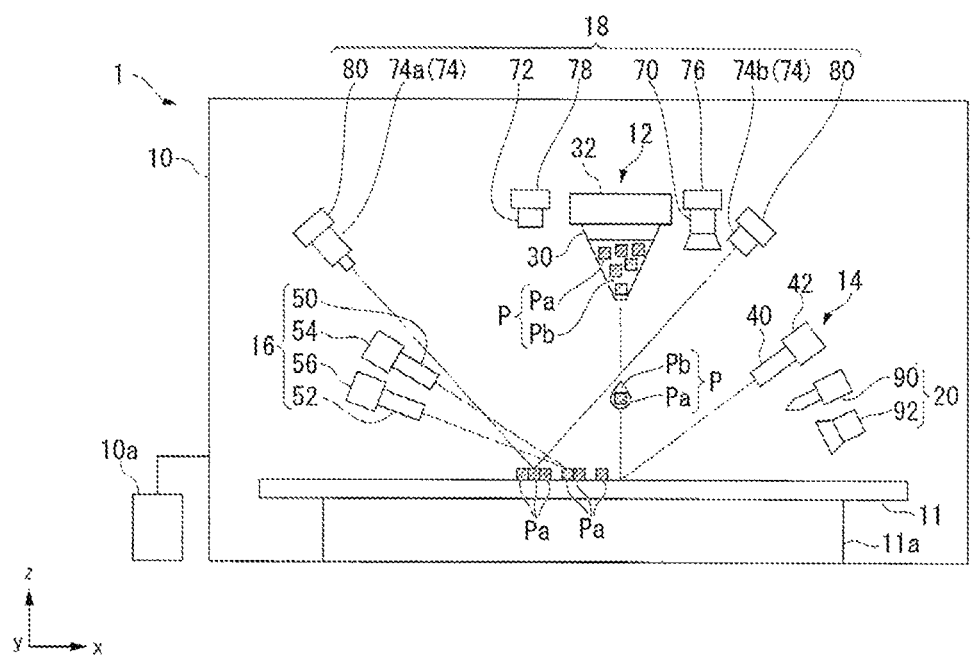
FIG. 1 is a schematic front diagram showing a forming apparatus according to a first embodiment.

DESCRIPTION OF REFERENCE NUMERALS 1, 101, 201: forming apparatus
10, 110, 210: chamber
10a, 110a, 210a: vacuum pump
11, 111, 211: stage
11a, 111a, 211a: stage moving mechanism
12, 112, 212: supply unit
14, 114, 214: immobilization unit
16, 116, 216: heating unit
18, 118, 218: information acquisition unit
20, 120, 220: removal unit
22, 122, 222: control unit
30, 230: dispenser
32, 232: dispenser moving mechanism
40: LED (light source)
42: LED moving mechanism
50, 150, 250: degreasing laser (degreasing heat source)
52, 152, 252: thermal solidification laser (thermal solidification heat source)
54, 254: degreasing laser moving mechanism
56, 256: thermal solidification laser moving mechanism
70, 170, 270: photographing device
72, 172, 272: ultrasonic device
74, 174, 274: X-ray diffraction device
74a, 174a, 274a: X-ray irradiation unit
74b, 174b, 274b: X-ray detection unit
76, 176, 276: photographing device moving mechanism
78, 178, 278: ultrasonic device moving mechanism
80, 180, 280: X-ray diffraction device moving mechanism
90, 190, 290: cutting device
92, 192, 292: recovery device
94, 194, 294: input unit
130: first dispenser (first supplier)
132: second dispenser (second supplier)
134: first dispenser moving mechanism
136: second dispenser moving mechanism
144: first LED moving mechanism
146: second LED moving mechanism
150: first degreasing laser
152: first thermal solidification laser
154: second degreasing laser
156: second thermal solidification laser
158: first degreasing laser moving mechanism
160: first thermal solidification laser moving mechanism
162: second degreasing laser moving mechanism
164: second thermal solidification laser moving mechanism
240: melting laser (melting heat source)
242: melting laser moving mechanism.

BEST MODE

Hereinafter, a forming apparatus and a method for producing a formed body according to embodiments of the present disclosure will be described with reference to the accompanying drawings. Further, in the following description, like reference numerals refer to components having the same or similar function. The overlapping description of these components will be properly omitted.

In the present specification, the term 'based on XX' means 'based on at least XX', and includes a case based on other elements in addition to XX. Further, the term 'based on XX' is not limited to a case of using XX directly, and also includes the case based on a case where calculation or processing has been performed with respect to XX. The term 'XX' is any element (for example, any information).

For convenience of explanation, the x-direction, the y-direction, and the z-direction will now be defined. The x-direction and the y-direction are directions parallel to the horizontal plane. The y-direction is a direction intersecting (for example, approximately orthogonal to) with the x-direction. The z-direction is a direction parallel to the vertical direction and is approximately orthogonal to the x-direction and the y-direction.

First Embodiment

A first embodiment will be described with reference to FIGS. 1 to 4. FIG. 1 is a diagram showing a forming apparatus 1 according to the first embodiment.

[Configuration]

The forming apparatus 1 can produce a three-dimensional formed body made of an inorganic material. Here, the term 'inorganic material' refers to any material other than an organic material, and includes single metals, alloys, compounds consisting of metal elements and nonmetal elements (for example, metal oxides, metal nitrides, metal salts, or the like), compounds consisting of nonmetal elements (for example, boron nitride or the like), and the like.

Figure 2:
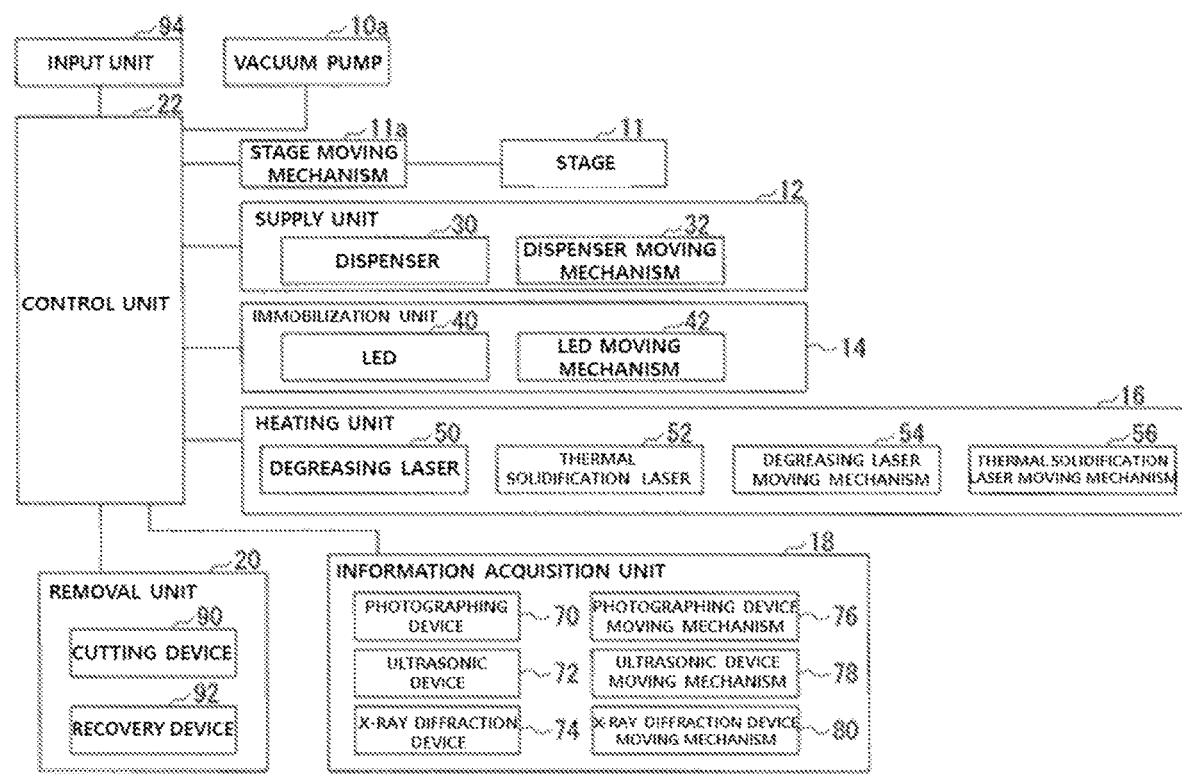
FIG. 2 is a block diagram showing an example of a system configuration of the forming apparatus of the first embodiment.

As shown in FIG. 1, the forming apparatus 1 includes a chamber 10, a stage 11, a supply unit 12, an immobilization unit 14, a heating unit 16, an information acquisition unit 18, a removal unit 20, and a control unit 22 (see FIG. 2).

The chamber 10 has a housing for accommodating each component of the forming apparatus 1. Each component of the forming apparatus 1 accommodated in the chamber 10 can be isolated from the external environment. The internal pressure of the chamber 10 can be changed by a vacuum pump 10a connected to the chamber 10.

The stage 11 is a flat plate disposed along a horizontal plane (that is, parallel to the xy-plane). The thickness direction of the stage 11 is approximately parallel to the z-direction. The stage 11 is movable at least in the z-direction by a stage moving mechanism 11a. The stage moving mechanism 11a is, for example, a rack-and-pinion type actuator driven by a motor (not shown). Further, the arrangement of the stage 11 is not necessarily limited to the above example. For example, the stage 11 can also be disposed along the plane intersecting the horizontal plane.

The supply unit 12 is spaced apart from the stage 11 to have a dispenser 30 disposed above the stage 11. The dispenser 30 is movable at least in the x-direction and the y-direction by a dispenser moving mechanism 32. The dispenser moving mechanism 32 is, for example, an articulated arm driven by a motor (not shown).

The dispenser 30 is filled with a composition (P) containing an inorganic material. The dispenser 30 can intermittently or continuously discharge the composition (P) toward the stage 11. The discharge amount (for example, the volume of one drop in a case where the composition (P) is intermittently discharged) or discharge rate of the supply unit 12 can be appropriately adjusted. The detail of the composition (P) will be described later.

Here, the landing surface on which the composition (P) is discharged from the dispenser 30 and lands can be a surface of any one, such as the stage 11, a substrate supported on the stage 11 or the like, or another composition (P) or a material film immobilized or solidified on the stage 11 or the substrate. Hereinafter, although the case where the discharged composition (P) lands on the stage 11 is mainly described, the following description is also applied to a case where the composition (P) lands on another landing surface such as the surface of another composition (P). Further, in the present specification, the term 'stage' collectively refers to the substrate in a case where the substrate is disposed on the stage. Further, in the present specification, the term 'direction along the stage' means a direction along the surface (surface of the stage 11 in FIG. 1) facing the dispenser, which discharges the composition, among the respective surfaces of the stage, and the term 'direction orthogonal to the stage' means a direction orthogonal to the surface facing the dispenser, which discharges the composition, among the respective surfaces of the stage.

The immobilization unit 14 immobilizes the discharged composition (P) onto the stage 11. For example, if the composition (P) contains a photocurable composition, the immobilization unit 14 irradiates light (for example, ultraviolet light) to a specific position where the composition (P) on the stage 11 is present. As a result, the immobilization unit 14 can apply optical stimulation to the composition (P) on the stage 11, thereby curing the photocurable composition contained in the composition (P). In the present specification, the term 'immobilization' means making a state where the position is not substantially changed in a case where an external force is not applied.

The immobilization unit 14 includes a light emitting diode (LED; light source) 40 as a light source. The LED 40 is spaced apart from the stage 11 to be disposed above the stage 11. The LED 40 is movable at least in the x-direction and/or the y-direction by an LED moving mechanism 42, and is rotatable around the z axis, for example, and is rotatable even in the plane parallel to the z axis. The LED moving mechanism 42 changes the irradiation position of the LED 40 by changing the arrangement (for example, direction, position, or the like) of the LED 40. The LED moving mechanism 42 is, for example, an articulated arm driven by a motor (not shown).

However, a configuration of the LED 40 is not limited to the above example. For example, the LED 40 can irradiate light from the side or the bottom of the stage 11. Further, the LED moving mechanism 42 can be omitted, and the arrangement of the LED 40 can be fixed permanently, and the irradiation light can be scanned on the stage 11 by using, for example, a lens, a reflecting plate, or the like. The LED moving mechanism 42 can be used together with a lens, a reflecting plate, or the like.

Further, the component of the immobilization unit 14 is not limited to the LED, and can also be any element capable of irradiating light, such as a laser. Light irradiation can be performed locally on the composition (P) spot having a size of about one drop to several drops on the stage 11, and can also be performed on some compartments or the whole of the stage 11.

Here, for example, if a one-dimensional array type LED disposed to cover the entire width of the stage 11 along the x-direction or the y-direction is used, it is sufficient as long as the LED can move only in any one direction of the x-direction and the y-direction. Further, for example, if the LED 40 capable of irradiating light to the whole of the stage 11 is used, the component which controls the light irradiation position of the LED 40, such as the LED moving mechanism 42, a lens, or a reflecting plate is unnecessary.

The heating unit 16 locally applies heat to a specific position on the stage 11 by, for example, irradiating a heat ray. As a result, the heating unit 16 can perform degreasing of the composition (P) immobilized onto the stage 11 or sintering or melting-solidification of the inorganic material contained in the composition (P). Here, the term 'sintering' means heating the solid particle (for example, powder of metal oxides, metal nitrides, or the like) of the inorganic material to a temperature lower than the melting point of the inorganic material to bond the solid particles together. The term 'melting-solidification' means heating the solid particle (for example, particle such as a metal or an alloy) of the inorganic material to a temperature equal to or higher than the melting point of the inorganic material to melt the solid particle, and then solidify the metal particle or the alloy particle by natural cooling or the like. In the present specification, the sintering and the melting-solidification are collectively referred to as 'thermal solidification'.

The heating unit 16 includes a degreasing laser (degreasing heat source) 50 and a thermal solidification laser (thermal solidification heat source) 52 as heat sources. The degreasing laser 50 and the thermal solidification laser 52 are spaced apart from the stage 11 to be disposed above the stage 11. The degreasing laser 50 is movable at least in the x-direction and the y-direction by a degreasing laser moving mechanism 54, and is rotatable, for example, around the z axis, and is rotatable even in the plane parallel to the z axis. The thermal solidification laser 52 is movable at least in the x-direction and the y-direction by a thermal solidification laser moving mechanism 56, and is rotatable, for example, around the z axis, and is rotatable even in the plane parallel to the z axis. The degreasing laser moving mechanism 54 and the thermal solidification laser moving mechanism 56 are, for example, articulated arms driven by a motor (not shown).

The degreasing laser 50 can perform laser irradiation to the composition (P) to heat the composition (P) to a temperature of, for example, 200° C. to 800° C., preferably 300° C. to 500° C., thereby performing the degreasing of the composition (P). The thermal solidification laser 52 can perform laser irradiation to the composition (P) to heat the composition (P) to a temperature of, for example, 500° C. to 4000° C., preferably 1000° C. to 3000° C., thereby performing the thermal solidification of the composition (P). However, the heating temperature is not limited thereto, and can be appropriately changed according to the kind or the like of an inorganic particle (Pa) or a binder (Pb) contained in the composition (P). Further, by using two identical laser devices as the degreasing laser 50 and the thermal solidification laser 52 to adjust the output, heating to different temperatures can also be performed by the degreasing laser 50 and the thermal solidification laser 52. Further, both degreasing and thermal solidification can also be performed by using a single laser. In this case, the output of the single laser can be changed in the degreasing step and the thermal solidification step, and the degreasing and the thermal solidification can also be performed at once by heating the composition (P) to a thermal solidification temperature at once by the single laser while omitting the degreasing step.

Further, the component of the heating unit 16 is not limited to laser, and can also be any element capable of the local heating such as an electron beam device. Further, the heating is not limited to the heating from above, and for example, can also be a local heating from below.

The information acquisition unit 18 acquires information on at least one among the geometric state, physical state, and chemical state of the composition (P) on the stage 11. The information acquisition unit 18 includes a photographing device 70, an ultrasonic device 72, and an X-ray diffraction device 74. Based on various information acquired by the information acquisition unit 18, a feedback control of each unit of the forming apparatus 1 can be performed. The detail of such feedback control will be described later.

In the present specification, the term 'geometric state' means the state of an object which can be expressed by using spatial coordinates in a three-dimensional space, and includes the arrangement, size, shape, and the like of the object. Further, the term 'physical state' means the state of an object which can be expressed based on physics (for example, by physical quantities or physics reclassification), and includes a density, a crystal phase, physical properties, and the like. Further, the term 'chemical state' means the state of an object which can be expressed based on chemistry, and includes a chemical composition, a chemical structure, a charge state, and the like.

The photographing device 70 photographs the composition (P) on the stage 11. The photographing device 70 is spaced apart from the stage 11 to be disposed above the stage 11. The information acquisition unit 18 acquires, based on the photographed image, information on the landing position and timing of the composition (P) discharged toward the stage 11, the geometric state such as the size or position of the composition (P) already positioned on the stage 11, and furthermore, the shape (for example, the shape of heat shrinkage) of the composition (P). Further, the photographing device 70 can also measure the size of the composition (P) in the z-direction by depth measurement.

The photographing device 70 is movable at least in the x-direction and/or the y-direction by a photographing device moving mechanism 76, and is rotatable, for example, around the z axis, and is rotatable even in the plane parallel to the z axis. The photographing device moving mechanism 76 is, for example, an articulated arm driven by a motor (not shown). However, the arrangement of the photographing device 70 is not limited to the above example, and one or a plurality of photographing devices 70 can also be disposed at the side of the stage 11 or the like.

The ultrasonic device 72 transmits ultrasonic waves toward the composition (P) on the stage 11, and receives the ultrasonic waves reflected by the composition (P). The ultrasonic device 72 is spaced apart from the stage 11 to be disposed above the stage 11. The information acquisition unit 18 can acquire the information on the physical state of the composition (P) such as the density of the composition (P) on the stage 11, for example, based on the information (for example, the size of the composition (P) on the stage 11) obtained from the photographing device 70 or the information (for example, the time from the transmission of ultrasonic waves to the reception of the reflected ultrasonic waves) obtained from the ultrasonic device 72. Specifically, the propagation speed of the ultrasonic waves in the composition (P) is calculated by dividing the distance where the ultrasonic waves have passed through the composition (P) by the time required for the ultrasonic waves to pass through the composition (P), and the volume density of the composition (P) is calculated by dividing the volume modulus of the composition (P) by the propagation speed squared. Further, the information acquisition unit 18 can also acquire information on the geometric state of the composition (P) such as the presence or absence and sizes of cracks or pores of the composition (P) on the stage 11 by comparing a theoretical value and an actually measured value of the density of the composition (P). Here, in the present specification, the term 'cracks' mean cracks generated on the surface or inside of an object, and the term 'pores' mean voids generated inside an object.

The ultrasonic device 72 is movable at least in the x-direction and/or the y-direction by an ultrasonic device moving mechanism 78, and is rotatable, for example, around the z axis, and is rotatable even in the plane parallel to the z axis. The ultrasonic device moving mechanism 78 is, for example, an articulated arm driven by a motor (not shown). Although the single ultrasonic device 72 is shown in FIG. 1, the ultrasonic device 72 can be divided into two components at the transmitting side and the receiving side of the ultrasonic waves (in this case, the ultrasonic waves having passed through the composition (P) rather than the reflected ultrasonic waves can be received). A plurality of ultrasonic devices 72 can also be installed.

The X-ray diffraction device 74 measures the X-ray diffracted pattern of the composition (P) on the stage 11. The X-ray diffraction device 74 has an X-ray irradiation unit 74a and an X-ray detection unit 74b which are spaced apart from the stage 11 to be disposed above the stage 11. The X-ray irradiation unit 74a generates X-rays and irradiates the X-rays toward the composition (P) on the stage 11. The X-ray detection unit 74b measures the intensity of the X-rays diffracted by the composition (P). The X-ray irradiation unit 74a and the X-ray detection unit 74b are movable (for example, within the xz plane) by an X-ray diffraction device moving mechanism 80 so that an angle formed by a straight line and a vertical line connecting the X-ray irradiation unit 74a or the X-ray detection unit 74b and the composition (P) is changed, for example, from about 5° to about 90°. The X-ray irradiation unit 74*a* and the X-ray detection unit 74*b* are disposed to be symmetric to each other with respect to the vertical line passing through the composition (P) which is the measurement target, and is moved by the X-ray diffraction device moving mechanism 80 while maintaining the relationship which is symmetric to each other with respect to the vertical line. As described above, the X-ray diffracted pattern is acquired by performing the X-ray measurement while moving the X-ray irradiation unit 74*a* and the X-ray detection unit 74*b*. For example, based on the position, line width, or the like of the main peak of the X-ray diffracted pattern, information on the physical state or chemical state such as chemical composition, crystal phase, phase fraction, or crystallinity of the composition (P) can be acquired. The X-ray diffraction device moving mechanism 80 is, for example, a goniometer driven by a motor (not shown).

Further, the components of the information acquisition unit 18 are not limited only to the photographing device 70, the ultrasonic device 72, and the X-ray diffraction device 74, and can be a vibration detecting device, a heat detecting device, or the like installed to the stage 11, can also be a radiation analysis device such as an energy dispersion type X-ray analysis device, and these can be used together.

The removal unit 20 removes at least a portion of the composition (P) on the stage 11. The removal unit 20 has, for example, a cutting device 90 and a recovery device 92. The cutting device 90 physically scrapes off some or all of the composition (P) on the stage 11. The cutting device 90 can be any one of a drill or a cutter, as long as it can scrape off the composition (P). The recovery device 92 sucks and recovers the fragments of the composition (P) scraped off by the cutting device 90, the impurity on the stage 11, or the like. For example, the recovery device 92 can have an intake function using a pump (not shown), have an air supply function which blows off the composition (P) from the stage 11, or have both the functions. The cutting device 90 and the recovery device 92 are movable by any moving mechanism (not shown). However, the configuration of the removal unit 20 is not limited to the above example. For example, the removal unit 20 can perform a cutting process of the composition (P) by an ion milling device, a laser processing device, or the like.

The control unit 22 (see FIG. 2) receives input data, such as three-dimensional shape data of the formed body produced, to control each component of the forming apparatus 1. The control unit 22 is realized by, for example, a processor such as a Central Processing Unit (CPU) or a Graphics Processing Unit (GPU). The operation of the control unit 22 will be described later.

[Composition]

The composition (P) which is discharged by the supply unit 12 is, for example, a fluid containing an inorganic particle (Pa) and a binder (Pb). The composition (P) is prepared by dispersing the inorganic particle (Pa) in the binder (Pb). The composition (P) fills the dispenser 30 in a state where the inorganic particle (Pa) has been dispersed in the binder (Pb).

The inorganic particle (Pa) is, for example, a particle composed of any inorganic materials consisting of metal, oxide, nitride, oxynitride, carbide, hydroxide, carbonate, and phosphate, or a combination thereof. The material of the inorganic particle (Pa) is not particularly limited.

Examples of the metal can be aluminum, titanium, iron, copper, stainless steel, nickel chromium steel, and the like.

Examples of the oxide can be silicon dioxide, aluminum oxide, magnesium oxide, titanium oxide, iron oxide, zinc oxide, yttrium oxide, zirconium oxide, barium titanate, and the like.

Examples of the nitride can be silicon nitride, aluminum nitride, titanium nitride, iron nitride, and the like.

Examples of the oxynitride can be silicon oxynitride, aluminum oxynitride, and the like.

Examples of the carbide can be silicon carbide, titanium carbide, boron carbide, zirconium carbide, and the like.

Examples of the hydroxide can be magnesium hydroxide, iron hydroxide, hydroxyapatite, and the like.

Examples of the carbonate can be calcium carbonate, sodium carbonate, potassium carbonate, lithium carbonate, and the like.

Examples of the phosphate can be iron phosphate, manganese phosphate, calcium phosphate, and the like.

The binder (Pb) contains, for example, a photocurable composition which is cured by receiving light having a specific wavelength (for example, ultraviolet light). The photocurable composition contains, for example, a radically polymerizable monomer or a cationically polymerizable monomer, and a photopolymerization initiator. The radically polymerizable monomer is, for example, a (meth)acrylic monomer. The cationically polymerizable monomer is, for example, an epoxy compound or a cyclic ether compound. If the radically polymerizable monomer is used, the photopolymerization initiator is, for example, a radical photopolymerization initiator such as acetophenone. Further, if the cationically polymerizable monomer is used, the photopolymerization initiator is, for example, a cationic photopolymerization initiator such as an onium salt.

The content of the inorganic particle (Pa) in the composition (P) is, for example, 30 wt % to 90 wt %, preferably 40 wt % to 80 wt %, more preferably, 50 wt % to 70 wt %.

The composition (P) can contain any additives, such as a stabilizer, a dispersing agent, and a filler, in addition to the inorganic particle (Pa) and the binder (Pb).

[System Configuration]

Next, the system configuration of the forming apparatus 1 of the first embodiment will be described with reference to FIG. 2.

FIG. 2 is a block diagram showing an example of the system configuration of the forming apparatus 1 of the first embodiment.

An input unit 94 receives the input data of the formed body to be produced, and also transmits the input data to the control unit 22.

The information acquisition unit 18 acquires information on at least one among the geometric state, physical state, and chemical state of the composition (P) on the stage 11 by using the photographing device 70, the ultrasonic device 72, and the X-ray diffraction device 74, and transmits the information to the control unit 22. The information includes, for example, the position, size, shape, the shape of heat shrinkage, volume density, the presence or absence and size of cracks or pores, chemical composition, crystal phase, crystallinity, and the like of the composition (P) already positioned on the stage 11. Further, the information acquisition unit 18 can also acquire, for example, the information (for example, the landing position, timing, or the like of the composition (P)) of the landing of the composition (P) on the stage 11 by the photographing device 70.

The control unit 22 determines a next position on the stage 11 where the composition (P) is to be discharged (hereinafter, referred to as 'discharge position'), or each next position on the stage 11 where each of the LED 40, the degreasing laser 50, and the thermal solidification laser 52 is to be irradiated (hereinafter, collectively referred to as 'irradiation position'), based on the input data from the input unit 94, the information acquired from the information acquisition unit 18, or the like. The control unit 22 controls the stage moving mechanism 11a so that the stage 11 is moved to an appropriate position, and controls the dispenser moving mechanism 32, the LED moving mechanism 42, the degreasing laser moving mechanism 54, and the thermal solidification laser moving mechanism 56 so that the dispenser 30, the LED 40, the degreasing laser 50, and the thermal solidification laser 52 are appropriately disposed, according to the thus determined discharge position or irradiation position.

Further, the control unit 22 controls the supply unit 12 to discharge an appropriate amount of the composition (P) at an appropriate timing, and controls each of the LED 40, the degreasing laser 50, and the thermal solidification laser 52, respectively, to irradiate light for curing the binder (Pb) or laser beam for performing degreasing and thermal solidification at an appropriate timing, based on the input data, the information from the information acquisition unit 18, or the like.

Further, the control unit 22 can determine a next position on the stage 11 to be photographed by the photographing device 70, a next position on the stage 11 where ultrasonic waves are to be irradiated by the ultrasonic device 72, a next position on the stage 11 where the X-ray diffracted pattern is to be measured by the X-ray diffraction device 74, and the like (hereinafter, collectively referred to as 'measurement position'), based on the input data, the information from the information acquisition unit 18, or the like. Based on these measurement positions, the control unit 22 controls the photographing device moving mechanism 76, the ultrasonic device moving mechanism 78, and the X-ray diffraction device moving mechanism 80 so that the photographing device 70, the ultrasonic device 72, and the X-ray diffraction device 74 are disposed appropriately. Further, the control unit 22 controls the photographing device 70, the ultrasonic device 72, and the X-ray diffraction device 74 to perform various measurements at an appropriate timing to acquire information.

Further, the control unit 22 can determine a next position on the stage 11 where the composition (P) is to be removed (hereinafter, referred to as 'removal position'), based on the input data, the information from the information acquisition unit 18 (for example, image data by the photographing device 70 or density data by the ultrasonic device 72), or the like. Based on this position, the control unit 22 controls these moving mechanisms so that the cutting device 90 and the recovery device 92 are disposed appropriately, and controls the cutting device 90 and the recovery device 92 to scrape off the composition (P) at the removal position to recover the scraped composition (P).

As described above, the control unit 22 can perform a feedback control of the supply unit 12, the immobilization unit 14, the heating unit 16, the information acquisition unit 18, and the removing unit 20, based on the geometric state, physical state, and/or chemical state of the composition (P) which has already been immobilized and fixed on the stage 11.

For example, if the actual position of the composition (P) thermally solidified differs from the discharge position originally supposed by the position shift of the discharged composition (P), the heat shrinkage of the composition (P), or the like, the control unit 22 can detect such a position shift, and modify at least one among the next discharge position of the composition (P) discharged or the next irradiation positions of the LED 40, the degreasing laser 50, the thermal solidification laser 52, and the like, based on the image data from the photographing device 70 and the like.

Further, if the density of the composition (P) acquired by using the ultrasonic device 72 has been significantly smaller than the theoretical value, the control unit 22 reheats the composition (P), for example, in order to suppress the remaining of cracks and pores, thereby directing the thermal solidification laser 52 to cause thermal solidification inside the composition (P) to repair cracks and pores. Further, the control unit 22 can also direct the removing unit 20 to remove some or all of the composition (P) from the stage 11 in order to suppress the remaining of cracks and pores. The image data of the photographing device 70 and the like can also be used together to determine the presence or absence of cracks or the like. After removing some or all of the composition (P) as described above, the control unit 22 can determine the next discharge position and irradiation position to fill the removed portion with the composition (P) (for example, to discharge the next composition (P) to the removed portion). Further, by irradiating laser beam from the thermal solidification laser 52 to the composition (P) again, the thermal solidification of a portion of the composition (P) near cracks or pores can be attempted again. In this case, by increasing the output of the thermal solidification laser 52, for example, it is possible to raise the temperature of the thermal solidification.

Further, if it is determined that the crystallinity of the composition (P) evaluated by the X-ray diffraction device is low, the control unit 22 can direct the thermal solidification laser 52 to irradiate laser beam to the composition (P) again to perform heating, in order to increase the crystallinity of the composition (P). Even in this case, for example, by adjusting the output of the thermal solidification laser 52, for example, it is possible to change the temperature of the thermal solidification.

[Method of Producing Formed Body]

Next, an example of a method of producing a formed body by the forming apparatus 1 of the first embodiment will be described with reference to FIGS. 3 and 4.

FIGS. 3A to 3F depicts steps of the method of producing a formed body by the forming apparatus 1 of the first embodiment.

FIGS. 3A to 3F depict a series of processes from the discharge to the thermal solidification of the composition (P) in the producing method.

Figure 3A:
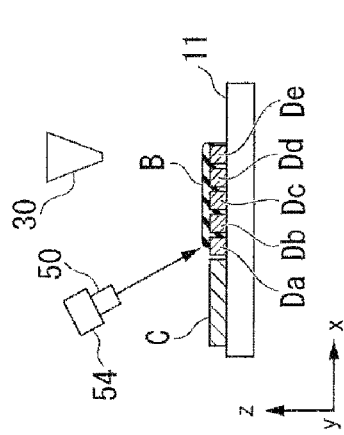
FIGS. 3A to 3F depict steps of a method of producing a formed body by the forming apparatus of the first embodiment.

In FIG. 3A, the composition (P) is discharged from the dispenser 30 toward the stage 11. Here, a thermally solidified body (C), which has been already thermally solidified, and inorganic particles (Da to Dd) surrounded by a cured binder (B) are formed on the stage 11. Further, in FIG. 3A, discharge of the composition (P) is performed in order from the left side (−x direction) to the right side (+x direction) of the figure. That is, as the process proceeds, the dispenser 30, the LED 40, the degreasing laser 50, and the thermal solidification laser 52 move in the +x-direction with respect to the stage 11.

Figure 3B:
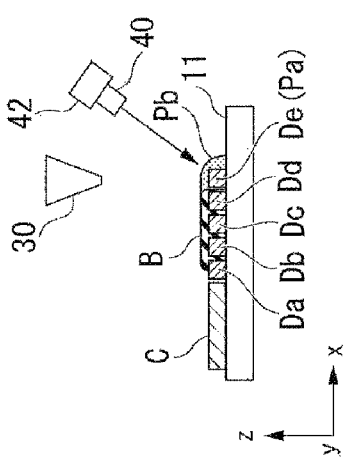

In FIG. 3B, the discharged composition (P) lands beside the inorganic particle (Dd). The information acquisition unit 18 acquires the landing position and timing of the composition (P). Immediately after landing, the binder (Pb) of the discharged composition (P) surrounds the inorganic particle (De(Pa)), and has fluidity. Toward this binder (Pb), the LED 40 of the immobilization unit 14 irradiates light having a wavelength suitable for curing the binder (Pb).

Figure 3C:
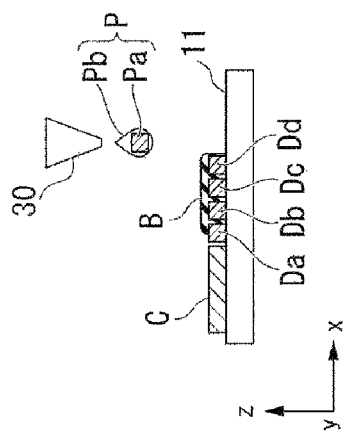

In FIG. 3C, the binder (Pb) containing a photocurable composition is cured to constitute a portion of the cured binder (B). As a result, the inorganic particle (De) contained in the discharged composition (P) is immobilized onto the stage 11. Next, the degreasing laser 50 of the heating unit 16 irradiates laser beam near the inorganic particle (Da) to apply heat to the binder (B). Further, here, although degreasing is performed near the inorganic particle (Da) spaced at a certain distance apart from the inorganic particle (De) immobilized immediately before, the distance between a position where the immobilization of the composition (P) is performed and a position where degreasing (and thermal solidification) is performed immediately thereafter can be determined according to various conditions, such as the property or discharge rate of the composition (P), and the intensity of the degreasing laser 50. For example, the position where the degreasing is performed can be the same as the position where the immobilization of the composition (P) is performed (that is, near the inorganic particle (De) immobilized immediately before).

Figure 3D:
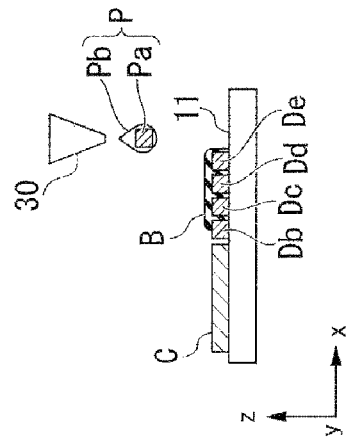

In FIG. 3D, the binder (B) near the inorganic particle (Da) is degreased by the degreasing laser 50, such that the inorganic particle (Da) is exposed. Next, the thermal solidification laser 52 of the heating unit 16 irradiates laser beam near the boundary between the thermally solidified body (C) and the inorganic particle (Da), thereby applying heat to the thermally solidified body (C) and the inorganic particle (Da). As a result, the thermal solidification occurs between the thermally solidified body (C) and the inorganic particle (Da).

Figure 3E:
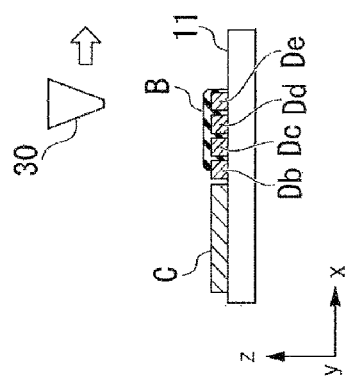

In FIG. 3E, the inorganic particle (Da) is integrated with the thermally solidified body (C) by the thermal solidification of the thermally solidified body (C) and the inorganic particle (Da). Next, the control unit 22 determines one side or both sides of the next discharge position of the composition (P) and the next irradiation positions of the immobilization unit 14 and the heating unit 16, considering the shape of thermal shrinkage of the composition (P) on the stage or the like, based on the image data on the stage 11, received from the information acquisition unit 18, radiation analysis data (for example, data obtained by X-ray diffraction measurement), ultrasonic analysis data, or the like. Based on the determined discharge position or irradiation position, the dispenser moving mechanism 32, the LED moving mechanism 42, the degreasing laser moving mechanism 54, and the thermal solidification laser moving mechanism 56 move the dispenser 30, the LED 40, the degreasing laser 50, and the thermal solidification laser 52 in the +x-direction with respect to the stage 11 (here, the LED 40, the degreasing laser 50, and the thermal solidification laser 52 are not shown). This moving direction or moving distance is changed according to the next place where the composition (P) is to be discharged. In this example, the next discharge position is right next to the inorganic particle (De) (see FIG. 3F). Of course, according to the structure of the formed body produced, a section where the composition (P) is not discharged can be present between the inorganic particle (De) and the next discharge position.

Figure 3F:
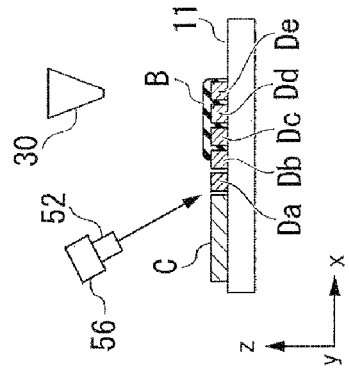

In FIG. 3F, as in FIG. 3A, the composition (P) is discharged again from the dispenser 30 toward the stage 11. Thereafter, the operations described with reference to FIGS. 3B to 3E are repeated.

For example, after the above-described process is performed from one end to the other end of the stage 11 along the x-direction, the supply unit 12, the immobilization unit 14, and the heating unit 16 are slightly moved along the y-direction, and the above process is performed again from one end to the other end of the stage 11 along the x-direction.

As described above, by repeating the process along the x-direction while moving the discharge position and the irradiation position little by little in the y-direction, each step of the discharge, immobilization, degreasing, and thermal solidification of the composition (P) can be executed throughout the stage 11.

Further, the method of moving the supply unit 12, the immobilization unit 14, and the heating unit 16 with respect to the stage 11 is not limited thereto. For example, the process can also be performed along the y-direction rather than the x-direction. Further, rather than repeating the movement along a specific direction, moving the supply unit 12, the immobilization unit 14 and the heating unit 16 directly to any position where the composition (P) is to be discharged can also be repeated. For example, a position having the shortest distance from the current position of the supply unit 12 among the respective positions where the composition (P) is to be discharged can be selected as the next discharge position.

Figure 4:
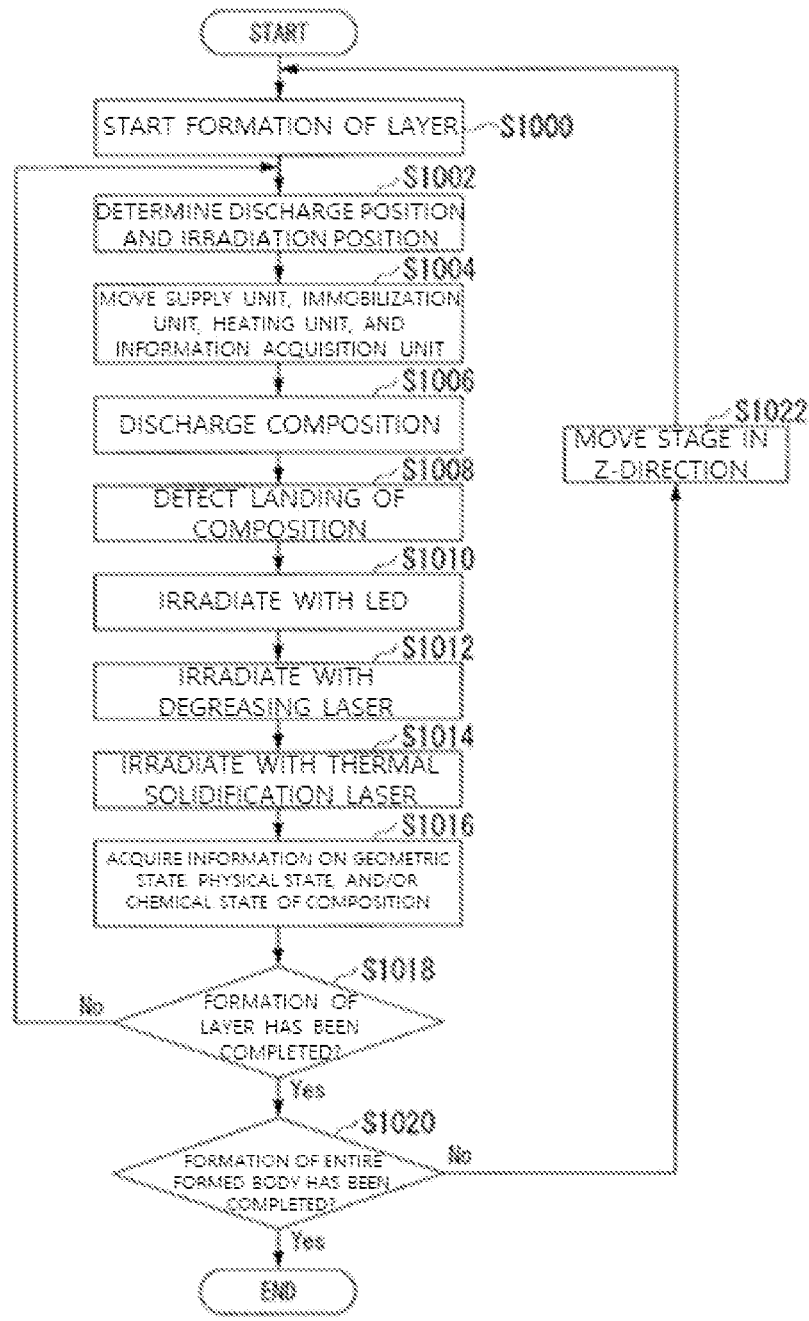
FIG. 4 is a flowchart showing an example of the method of producing a formed body by the forming apparatus of the first embodiment.

FIG. 4 is a flowchart showing an example of the method of producing a formed body by the forming apparatus 1 of the first embodiment.

If formation of a first layer on the stage 11 is started (S1000), the control unit 22 first determines the initial discharge position and irradiation position, based on input data of the three-dimensional fo fled body received from the input unit 94 (S1002). Next, the control unit 22 directs the dispenser moving mechanism 32, the LED moving mechanism 42, the degreasing laser moving mechanism 54, and the thermal solidification laser moving mechanism 56 to move the dispenser 30, the LED 40, the degreasing laser 50, and the thermal solidification laser 52 to appropriate arrangements, based on the determined discharge position and irradiation position (S1004).

Next, the control unit 22 directs the dispenser 30 to discharge the composition (P) toward the stage 11 (S1006). If the composition (P) is discharged to land on the stage 11, the information acquisition unit 18 detects the landing of the composition (P) (S1008). For example, the information acquisition unit 18 performs image comparison by performing photographing on the stage 11 continuously or regularly by the photographing device 70, thereby detecting the landing position and timing of the composition (P).

Next, the control unit 22 directs the LED 40 to irradiate light for immobilizing the landing composition (P) on the stage (here, curing the binder (Pb)) (S1010). As a result, the binder (Pb) containing a photocurable composition is cured, such that the composition (P) is immobilized on the stage 11.

Next, the control unit 22 directs the degreasing laser 50 to irradiate laser beam for degreasing the binder (Pb) of the composition (P) on the stage 11 (S1012). The irradiation position of the degreasing laser 50 can be the same as the irradiation position of the LED 40, and as described with reference to FIG. 3, can be another position which is spaced at a certain distance apart from the irradiation position of the LED 40 where the composition (P) has been immobilized immediately before.

Next, the control unit 22 directs the thermal solidification laser 52 to irradiate laser beam for performing the thermal solidification of the inorganic particle (Pa) of the composition (P) on the stage 11 (S1014). The irradiation position of the thermal solidification laser 52 can be the same as the irradiation position of the degreasing laser 50, and can be another position which is spaced at a certain distance apart therefrom.

Next, the control unit 22 directs the information acquisition unit 18 to acquire information on the geometric state, physical state, and/or chemical state of the composition (P) on the stage 11 (S1016). For example, the control unit 22 directs the photographing device 70 to photograph the immobilized composition (P), the degreased composition (P), or the thermally solidified composition (P) in each step described above. Based on the photographed image data, the information acquisition unit 18 acquires the information on the geometric state such as the position, size, shape, or the presence or absence of cracks of the composition (P) on the stage 11. Further, for example, the control unit 22 directs the ultrasonic device 72 to irradiate ultrasonic waves to the composition (P) thermally solidified in the above step. Based on the data of the ultrasonic measurement, the information acquisition unit 18 acquires information on the physical state such as the density of the composition (P) on the stage 11 and acquires information on the geometric state such as the presence or absence and sizes of cracks or pores. Further, for example, the control unit 22 directs the X-ray diffraction device 74 to measure an X-ray diffracted pattern with respect to the composition (P) thermally solidified in the above step. Based on the measured X-ray diffracted pattern, the information acquisition unit 18 acquires information on the physical state or chemical state such as chemical composition, crystal phase, phase fraction, or crystallinity of the composition (P) on the stage 11.

Next, the control unit 22 determines whether the formation of the first layer has been completed in view of the input data (S1018). If it is determined that the formation of the first layer has not been completed (S1018: NO), the flow returns to the S1002. That is, the control unit 22 determines the next discharge position where the composition (P) is to be discharged, and determines the next irradiation position of the LED 40, the degreasing laser 50, or the thermal solidification laser 52, based on the information on the geometric state, physical state, and/or chemical state of the composition (P) on the stage 11 acquired by the information acquisition unit 18. Thereafter, the aforementioned forming process of discharging, immobilizing, degreasing, and thermally solidifying the composition (P) is performed again.

Here, the next discharge position is determined by any method. For example, the next discharge position can be determined according to the order in which the process first proceeds from one end to the other end of the stage 11 along the x-direction, and then proceeds slightly in the y-direction, and proceeds again from one end to the other end of the stage along the x-direction, and proceeds slightly in the y-direction again, and the like as described above, and can also be determined based on the distance from the current position of the supply unit 12.

Meanwhile, if it is determined that formation of the first layer has been completed (S1018: YES), the control unit 22 determines whether formation of the entire formed body has been completed in view of the input data (S1020). If it is determined that formation of the entire formed body has not been completed (S1020: NO), the control unit 22 directs the stage moving mechanism 11a to move the stage 11 in the z-direction (for example, to descend the stage 11 by a distance corresponding to one layer in the z-direction) (S1022). Thereafter, the flow returns to the S1000, and formation of a second layer is started.

Meanwhile, if it is determined that formation of the entire formed body has been completed (S1020: YES), production of the formed body is completed. The formation of the first layer to the final layer is completed, thereby obtaining the formed body having any three-dimensional shape.

As described above, the forming apparatus 1 can form each layer of a three-dimensional formed body by repeating the forming cycle including the respective steps (S1002, S1004, S1006, S1008, S1010, S1012, S1014, and S1016) of the position control, the discharge, the immobilization, the degreasing, the thermal solidification, and the information acquisition, and can form a three-dimensional formed body by repeating such formation of layer from the first layer to the final layer. In the present specification, the team 'forming cycle' means a series of processes which are repeated for producing the formed body and composed of two or more steps (for example, a discharge step and a thermal solidification step). Here, the term 'repeating' means that the process is performed at least twice continuously or intermittently, and also includes, for example, a case where another process is interposed between any repeating unit and the next repeating unit.

It is not necessary to necessarily perform all of the above steps in each forming cycle, and one or more of the above steps can be omitted in some or all of the forming cycles. For example, in some forming cycles, only the position control (S1002, S1004) of the dispenser 30 and the LED 40, the discharge (S1006, S1008) and immobilization (S1010) of the composition (P), and the information acquisition (S1016) can be performed, and in another forming cycle, only the position control (S1002, S1004) of the degreasing laser 50 and the thermal solidification laser 52, the degreasing (S1012) and the thermal solidification (S1014) of the composition (P), and the information acquisition (S1016) can be performed. For example, in some forming cycles, only the thermal solidification (S1014) can be performed, and in some forming cycles, the thermal solidification cannot be performed.

Further, the order or the number of the respective steps can be arbitrarily changed, and any other step can also be added. For example, the movement of the immobilization unit 14, the heating unit 16, and the information acquisition unit 18 can be performed after the discharge (S1006) of the composition (P). For example, the acquiring of the information (S1016) can be performed not only after the thermally solidifying (S1014) but also after any step. Further, for example, after the acquiring of the information (S1016), directing, by the control unit 22, the removal unit 20 to partially remove the composition (P) on the stage 11 based on the acquired information can be added.

The forming cycle can be repeated at least along the stage 11. Here, the term 'along the stage' means 'along the surface facing the dispenser which discharges the composition among the respective surfaces of the stage'. Further, the term 'repeated at least along the stage' means that a plurality of forming cycles are performed along the stage, regardless of whether the forming cycle is repeated along the direction intersecting the stage. That is, as long as two or more forming cycles are performed continuously or intermittently along the stage, the forming cycle is repeated not only along the stage but also in the direction intersecting the stage, which corresponds to the 'repeated at least along the stage'. Further, in the present specification, the position where the forming cycle is performed corresponds to the position where the discharged composition (P) lands and the position where thermal solidification occurs, for example, if the forming cycle includes the discharging and the thermally solidifying. Therefore, the term 'forming cycle is performed along the stage' means that, for example, if the forming cycle includes the discharging and the thermally solidifying, the position where the composition (P) lands and the position where the thermal solidification occurs, in a plurality of forming cycles, follow the stage.

The forming cycle can be repeated within the same plane. Here, the term 'repeated within the same plane' means that four or more forming cycles sufficient to define a plane in the three-dimensional space are repeated on the plane.

[Effects]

In accordance with the forming apparatus 1 according to the first embodiment described above, the forming cycle including the supply of the composition (P) and the thermal solidification of the composition (P) is repeatedly performed. That is, the thermal solidification of the composition (P) is locally performed, and the next composition (P) is further supplied even after the thermal solidification operation has been performed. For example, since the immobilization of the composition (P) (curing of the binder (Pb)), the degreasing of the binder (Pb), and the thermal solidification of the inorganic particle (Pa) are sequentially performed so as to follow the supply of the composition (P) from the supply unit 12, these processes can be subdivided.

Since the degreasing process is subdivided and degreasing is performed on a small amount of the composition (P), the binder (Pb) can be removed for each degreasing operation, thereby suppressing the binder (Pb), the decomposed components of the binder (Pb), and the like from remaining in the formed body, as compared with the case where the entire formed body is degreased at once after the three-dimensional shaping of a binder having the inorganic particle dispersed therein has been performed as in the conventional stereolithography. Further, in the case where the degreasing of the entire formed body is performed as in the conventional stereolithography, a gap corresponding to the volume of the binder can occur inside the formed body, such that the finished formed body can be shrunk by the size of the gap, but if the degreasing process is subdivided as in the present embodiment, even if such a gap is generated, the composition (P) is continuously supplied, such that the gap can be filled with the next composition (P), thereby suppressing such shrinkage.

Further, since the thermal solidification process is subdivided and the thermal solidification is performed on a small amount of the composition (P), cracks or breakage of the thermally solidified body can be suppressed from occurring due to the difference in thermal expansion coefficients between portions of the formed body, as compared with the case where the thermal solidification of the entire degreased formed body is performed after the three-dimensional shaping has been first performed as in the conventional stereolithography. Even if cracks or the like have occurred due to thermal expansion, thermal shrinkage, and the like, the supply of the composition (P) is performed continuously, such that such a defect can be redeemed by the next composition (P), thereby suppressing the adverse effect of such a defect. As described above, if the discharge of the composition (P) is controlled in a feedback manner based on the thermal solidification result, it is possible to produce the solid formed body having a desired shape and size.

Further, in the case where three-dimensional shaping is performed by curing a precursor accommodated in a liquid tank for each layer as in the conventional stereolithography, it is necessary to remove an uncured binder after curing only a necessary portion for each layer, but the forming apparatus 1 according to the present embodiment does not require this process. For this reason, it is possible to reduce the cost of the forming process and to improve efficiency. Further, it is possible to reduce the restrictions in the conventional stereolithography, thereby improving the degree of freedom in the three-dimensional shaping of an inorganic material.

As a result, an inorganic material-containing formed body having improved quality can be produced.

Further, according to the present embodiment, the forming apparatus 1 includes the LED 40 as the immobilization unit 14, and includes the degreasing laser 50 and the thermal solidification laser 52 as the heating unit 16. As a result, it is possible to separately control the execution position, timing, or the like of each process of immobilization, degreasing and thermal solidification, thereby efficiently executing the sequential forming processes as described above.

Further, in the above example, the photocurable composition has been used as the binder (Pb) of the composition (P), but the binder (Pb) is not limited thereto. For example, a thermosetting composition such as phenol resin or polyurethane can be used as the binder (Pb), and a heat source (for example, a laser) for curing the thermosetting resin can be used instead of the LED 40 as the component of the immobilization unit 14. In this case, the binder (Pb) made of the thermosetting resin is cured by heat from the heat source, such that the composition (P) is immobilized on the stage 11. Alternatively, a thermoplastic composition such as polyethylene or polyethylene terephthalate can be used as the binder (Pb), and the composition (P) can be supplied toward the stage 11 with the binder (Pb) melted in the composition (P) by heating the composition (P) in advance. In this case, the binder (Pb) made of a thermoplastic resin is naturally cooled on the stage 11, such that the composition (P) is immobilized on the stage 11.

Second Embodiment

Next, a second embodiment will be described with reference to FIGS. 5 to 7. The second embodiment differs from the first embodiment in that the formed body made of two types of compositions by using two dispensers is produced. Further, the configurations except for configurations described below are the same as those of the first embodiment.

Figure 5:
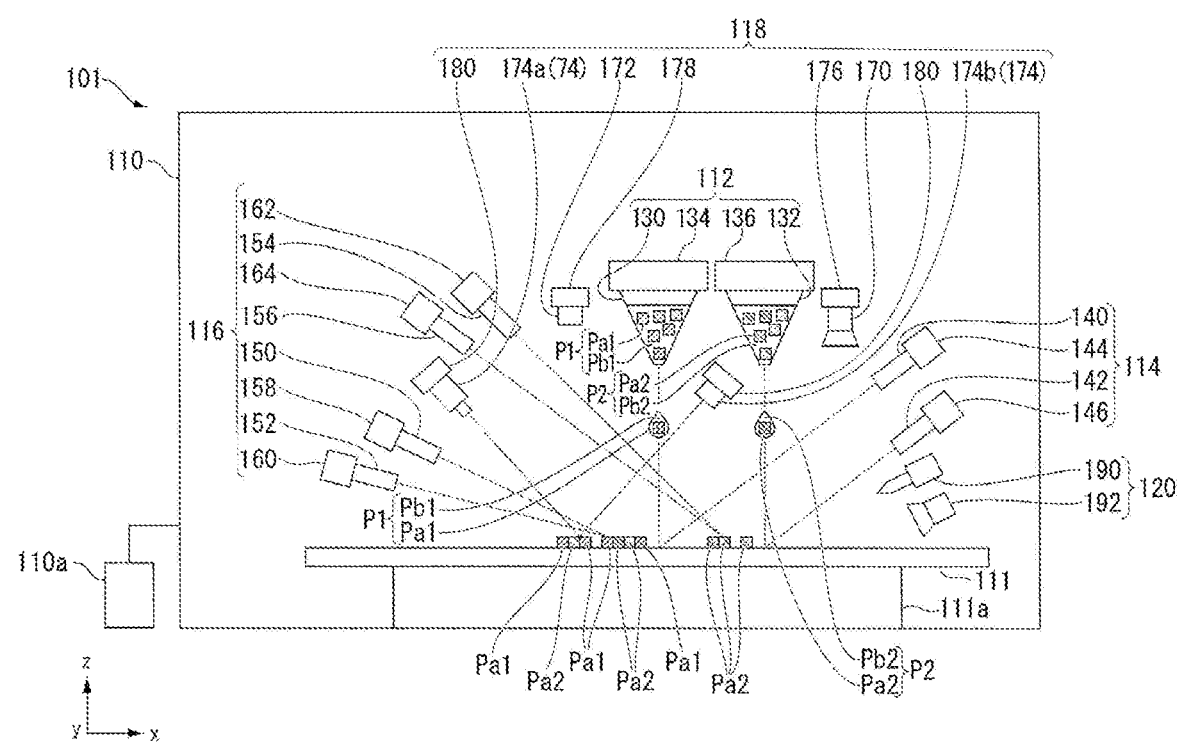
FIG. 5 is a schematic front diagram showing a forming apparatus according to a second embodiment.

FIG. 5 is a diagram showing a forming apparatus 101 according to the second embodiment. FIG. 6 is a block diagram showing an example of a system configuration of the forming apparatus 101 of the second embodiment.

Figure 6:
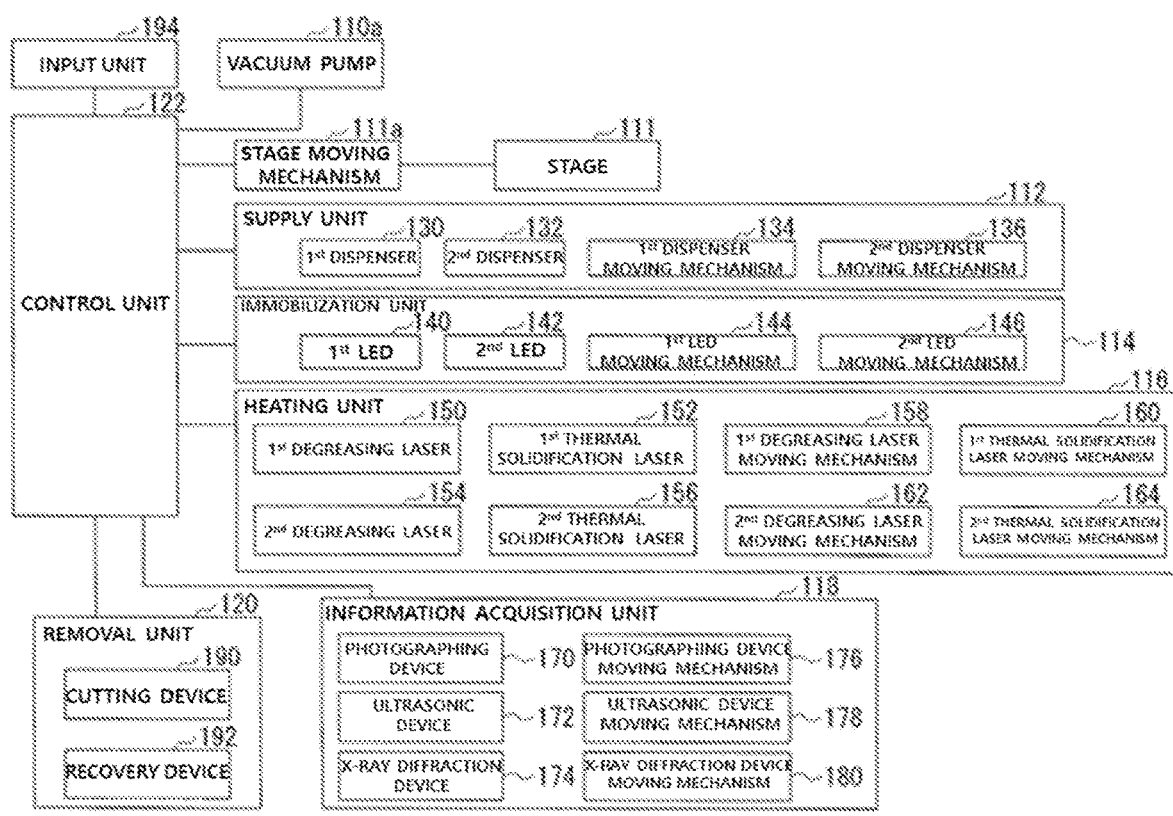
FIG. 6 is a block diagram showing an example of a system configuration of the forming apparatus of the second embodiment.

As shown in FIG. 5, the forming apparatus 101 according to the second embodiment includes a chamber 110, a stage 111, a supply unit 112, an immobilization unit 114, a heating unit 116, and an information acquisition unit 118, a removal unit 120, and a control unit 122 (see FIG. 6).

While the supply unit 12 of the first embodiment includes the single dispenser 30, the supply unit 112 includes a first dispenser (first supplier) 130 and a second dispenser (second supplier) 132. The first dispenser 130 discharges a first composition (P1) containing a first inorganic particle (Pa1) toward the stage 111 intermittently or continuously. The second dispenser 132 discharges a second composition (P2) containing a second inorganic particle (Pa2) toward the stage 111 intermittently or continuously. The first dispenser 130 and the second dispenser 132 are movable by a first dispenser moving mechanism 134 and a second dispenser moving mechanism 136, respectively.

The first composition (P1) is, for example, a fluid containing the first inorganic particle (Pa1) and a first binder (Pb1), like the composition (P) in the first embodiment. The second composition (P2) is, for example, a fluid containing the second inorganic particle (Pa2) and a second binder (Pb2). The first composition (P1) and the second composition (P2) fill the first dispenser 130 and the second dispenser 132, respectively, in a state where the inorganic particles (Pa1, Pa2) have been dispersed in the binders (Pb1, Pb2).

The first inorganic particle (Pa1) is, for example, the particle made of any inorganic material, such as metal, oxide, nitride, oxynitride, carbide, hydroxide, carbonate, or phosphate, or a combination thereof, like the inorganic particle (Pa) of the first embodiment. The second inorganic particle (Pa2) is the particle made of any inorganic material different from the first inorganic particle (Pa1) or a combination of the inorganic materials. The materials of the inorganic particles (Pa1, Pa2) are not particularly limited. Further, although the second inorganic particle (Pa2) can be the same as the first inorganic particle (Pa1), hereinafter, the example of using the second inorganic particle (Pa2) different from the first inorganic particle (Pa1) will be described.

The first binder (Pb1) contains, for example, the photocurable composition which is cured by receiving light (for example, ultraviolet light) having a specific wavelength, like the binder (Pb) of the first embodiment. Likewise, the second binder (Pb2) also contains a photocurable composition. The photocurable composition of the first binder (Pb1) and the photocurable composition of the second binder (Pb2) can be the same as or different from each other.

While the immobilization unit 14 of the first embodiment includes the single LED 40, the immobilization unit 114 includes a first LED 140 for the first composition (P1) and a second LED 142 for the second composition (P2). The first LED 140 immobilizes the first composition (P1) on the stage 111 by curing the first binder (Pb1). The second LED 142 immobilizes the second composition (P2) on the stage 111 by curing the second binder (Pb2). The first LED 140 and the second LED 142 are movable by a first LED moving mechanism 144 and a second LED moving mechanism 146, respectively.

While the heating unit 16 of the first embodiment includes the single degreasing laser 50 and the single thermal solidification laser 52, the heating unit 116 includes a first degreasing laser 150 and a first thermal solidification laser 152 for the first composition (P1), and a second degreasing laser 154 and a second thermal solidification laser 156 for the second composition (P2). Both the first degreasing laser 150 and the first thermal solidification laser 152 perform laser irradiation on the first composition (P1) to heat the first composition (P1), thereby performing the degreasing and thermal solidification of the first composition (P1), respectively. Both the second degreasing laser 154 and the second thermal solidification laser 156 perform laser irradiation on the second composition (P2) to heat the second composition (P2), thereby performing the degreasing and thermal solidification of the second composition (P2), respectively. Further, the first thermal solidification laser 152 and the second thermal solidification laser 156 can also be used to thermally solidify the first composition (P1) and the second composition (P2) which are adjacent to each other on the stage 111. The heating temperature by the first thermal solidification laser 152 or the second thermal solidification laser 156 can be set to a temperature suitable for thermally solidifying the first composition (P1) and the second composition (P2) containing different materials. The first degreasing laser 150, the first thermal solidification laser 152, the second degreasing laser 154, and the second thermal solidification laser 156 are movable by a first degreasing laser moving mechanism 158, a first thermal solidification laser moving mechanism 160, a second degreasing laser moving mechanism 162, and a second thermal solidification laser moving mechanism 164.

As in the first embodiment, the control unit 122 can perform a feedback control of the supply unit 112, the immobilization unit 114, the heating unit 116, the information acquisition unit 118, and the removal unit 120, based on the geometric states, physical states, and/or chemical states of the first composition (P1) and the second composition (P2) acquired by the information acquisition unit 118. In addition to the example described for the first embodiment, in the second embodiment, for example, the control unit 122 can specify the mass ratio of the first composition (P1) and the second composition (P2) at the formation positions or the specific positions of the first composition (P1) and the second composition (P2) from the X-ray diffracted pattern or the like acquired by an X-ray diffraction device 174, and can determine the discharge positions or the irradiation positions for the respective compositions (P1, P2), whether to use the removal unit 120 for the respective compositions (P1, P2) or the like, based on such information.

Figure 7:
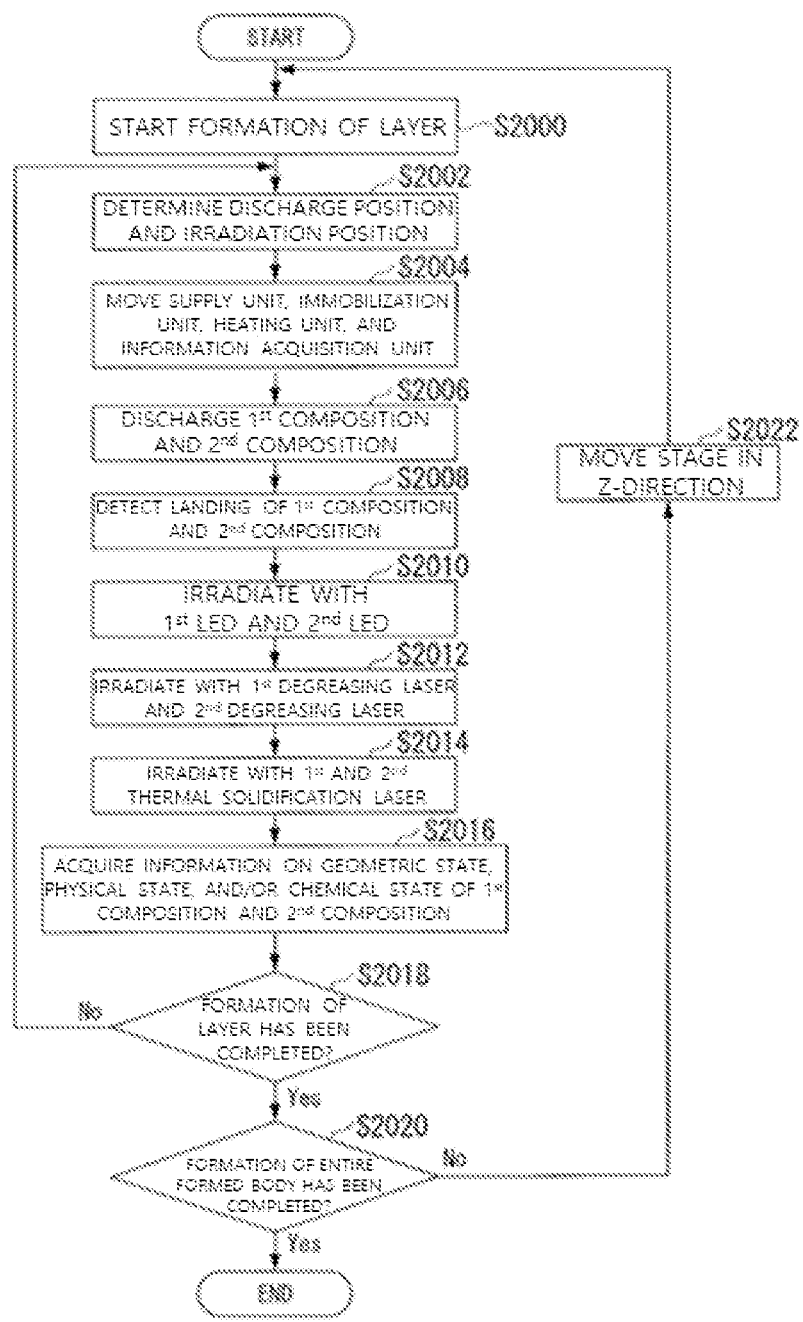
FIG. 7 is a flowchart showing an example of a method of producing a formed body by the forming apparatus of the second embodiment.

FIG. 7 is a flowchart showing an example of a method of producing a formed body by the forming apparatus 101 in the second embodiment.

The flow of the method of producing a formed body according to the second embodiment is basically the same as that of the first embodiment except for using two kinds of inorganic materials. That is, in FIG. 7, each step from the position control to the information acquisition in the method of producing a formed body by the forming apparatus 1 in the first embodiment described with reference to FIG. 4 is performed for each of the first composition (P1) and the second composition (P2).

If the formation of a first layer is started (S2000), the control unit 122 determines the discharge positions of the first composition (P1) and the second composition (P2), and the irradiation positions of the LEDs 140, 142, the degreasing lasers 150, 154, and the thermal solidification lasers 152, 156 (S2002).

Next, the control unit 122 directs each moving mechanism to move the supply unit 112, the immobilization unit 114, the heating unit 116, and the information acquisition unit 118, based on these discharge positions and irradiation positions (S2004).

Next, the control unit 122 directs the first dispenser 130 and the second dispenser 132 to discharge the first composition (P1) and the second composition (P2) toward the stage 111, respectively (S2006). These discharge timings can be simultaneous or can also be shifted. If the first composition (P1) and the second composition (P2) are discharged to land on the stage 111, the information acquisition unit 118 detects the landing of the first composition (P1) and the second composition (P2) (S2008).

Next, the control unit 122 directs the first LED 140 and the second LED 142 to irradiate light for immobilizing the first composition (P1) and the second composition (P2), which have landed, on the stage 111, respectively (S2010).

Next, the control unit 122 directs the first degreasing laser 150 and the second degreasing laser 154 to irradiate laser beam for degreasing the first binder (Pb1) of the first composition (P1) and the second binder (Pb2) of the second composition (P2) on the stage 111, respectively (S2012).

Next, the control unit 122 directs the first thermal solidification laser 152 and the second thermal solidification laser 156 to irradiate laser beam for thermally solidifying the first inorganic particle (Pa1) of the first composition (P1) and the second inorganic particle (Pa2) of the second composition (P2) on the stage 111, respectively (S2014).

Next, the control unit 122 directs the information acquisition unit 118 to acquire information on the geometric states, physical states, and/or chemical states of the first composition (P1) and the second composition (P2) on the stage 111 (S2016).

The forming cycle including the above steps (S2002, S2004, S2006, S2008, S2010, S2012, S2014, and S2016) described above is repeated until the formation of the layer is completed (S2018). If the formation of the first layer is completed (S2018: YES), the control unit 122 directs a stage moving mechanism 111a to move the stage 111 in the z-direction (S2022). The flow returns to the S2000 to start the formation of a second layer. By repeating such formation of layer, a three-dimensional formed body is formed.

In the above-described flow, both the first composition (P1) and the second composition (P2) are treated for each step of each forming cycle, but each treatment of the first composition (P1) and the second composition (P2) can be performed in any order. For example, in each forming cycle, the discharge, immobilization, degreasing, and thermal solidification of the first composition (P1) are first performed, and then the discharge, immobilization, degreasing, and thermal solidification of the second composition (P2) can be performed. Further, after the discharge and immobilization of the first composition (P1) and the second composition (P2) are performed, the degreasing and thermal solidification of the first composition (P1) can be first performed, and then the degreasing and thermal solidification of the second composition (P2) can be performed. Alternatively, the forming cycle is first repeated only for the first composition (P1), and the thermal solidification of all the first compositions (P1) to be included in the first layer has been completed, and then the forming cycle is repeated for the second composition (P2), such that the entire first layer can be formed.

According to the forming apparatus 101 according to the second embodiment, in addition to the advantages described for the forming apparatus 1 according to the first embodiment, it is possible to produce the formed body compositely formed by combing a plurality of materials variously. For example, it is possible to not only omit an assembling process but also omit the use of a bonding agent, a bonding part, or the like for bonding parts to each other, the formation of fitting shape, or the like, as compared with the case of producing the parts, made of each material, for each material and then assembling the parts. As a result, it is possible to significantly reduce the producing cost.

Since the forming apparatus 101 can select the material used for the formed body by a unit of one drop discharged from each dispenser, it is possible to control the material composition for the detailed configuration of the formed body. Further, since various kinds of inorganic materials can be used, the forming apparatus 101 can be used to produce the formed bodies for various uses such as industrial products, medical supplies, research and development articles, daily necessities, and ceramic products.

Further, since the temperature suitable for the thermal solidification of each material or the temperature suitable for the thermal solidification at the bonded portion of each material can be different temperature, the forming apparatus 101 can perform a feedback control of the outputs of the laser beams of the first thermal solidification laser 152 and the second thermal solidification laser 156, and the thermal solidification temperatures, based on the information from the information acquisition unit 118, as described above, such that the thermal solidification can be performed at an optimum temperature according to the material at each irradiation position. As a result, since various materials can be sufficiently and thermally solidified at any site, the quality of the formed body obtained is improved.

In the above example, two kinds of inorganic materials are used, but three or more kinds of inorganic materials can be used. According to the number of different kinds of inorganic materials, the number of the supply means such as the dispenser, the immobilization means such as the LED, the heating means such as the degreasing laser or the thermal solidification laser, and the like can also be appropriately changed to three or more.

In the above example, one LED, one degreasing laser, and one thermal solidification laser are installed (that is, two LEDs, two degreasing lasers, and two thermal solidification lasers are installed as a whole) with respect to each of the first composition (P1) and the second composition (P2), but some of these can also be omitted. That is, the immobilization of both the first composition (P1) and the second composition (P2) can be performed by using a single LED, and likewise, the degreasing or the thermal solidification of both the first composition (P1) and the second composition (P2) can be performed by a single degreasing laser or a single thermal solidification laser. In particular, if the forming cycle is preformed for each composition, the forming cycles of both the first composition (P1) and the second composition (P2) can be executed sequentially with a single LED or laser.

In the above example, the information acquisition unit 118 includes one photographing device 170, one ultrasonic device 172, and the one X-ray diffraction device 174, but the number thereof can be increased as necessary.

In the above example, the first composition (P1) and the second composition (P2) are discharged to different positions on the stage 111, respectively, but the discharge positions of the first composition (P1) and the second composition (P2) can be set to the same position on the stage 11. For example, by repeating the forming process by setting the discharge position of the first composition (P1) in each forming process to the same position as the discharge position of the second composition (P2), it is possible to produce a formed body formed by mixing the first composition (P1) and the second composition (P2) at a predetermined ratio. Further, by repeating the forming process while setting the discharge position of the first composition (P1) in each forming process to the same position as the discharge position of the second composition (P2), and gradually changing the ratio of the discharge amounts of the first composition (P1) and the second composition (P2), it is possible to produce a formed body in which the concentration ratio of the first composition (P1) and the second composition (P2) gradually changes according to the positions in the formed body.

In the above example, the control unit 122, for example, determines the next discharge position and irradiation position for each forming cycle, but can determine the presence or absence of the discharge of the first dispenser 130 and the second dispenser 132, the present or absence of the degreasing or the thermal solidification, or the like at each position, while continuously moving the first dispenser 130 and the second dispenser 132 at a constant speed in a predetermined direction. In this case, in the step where discharge work has been completed to some extent, based on the information acquired by the information acquisition unit 118, the discharge or the thermal solidification can be additionally performed at the position where it is determined that the first composition (P1) and the second composition (P2) have been discharged by that time but the degreasing or the thermal solidification has not been performed appropriately.

Third Embodiment

Next, a third embodiment will be described with reference with FIGS. 8 to 11. The third embodiment differs from the first embodiment in that an inorganic particle (Pa') uses a composition (P') having a configuration surrounded by an organic coating (Pb'), and a melting laser (melting heat source) 240 is used, instead of the LED 40, as a component of an immobilization unit 214. Further, the configurations except for the configurations described below are the same as those of the first embodiment.

Figure 8:
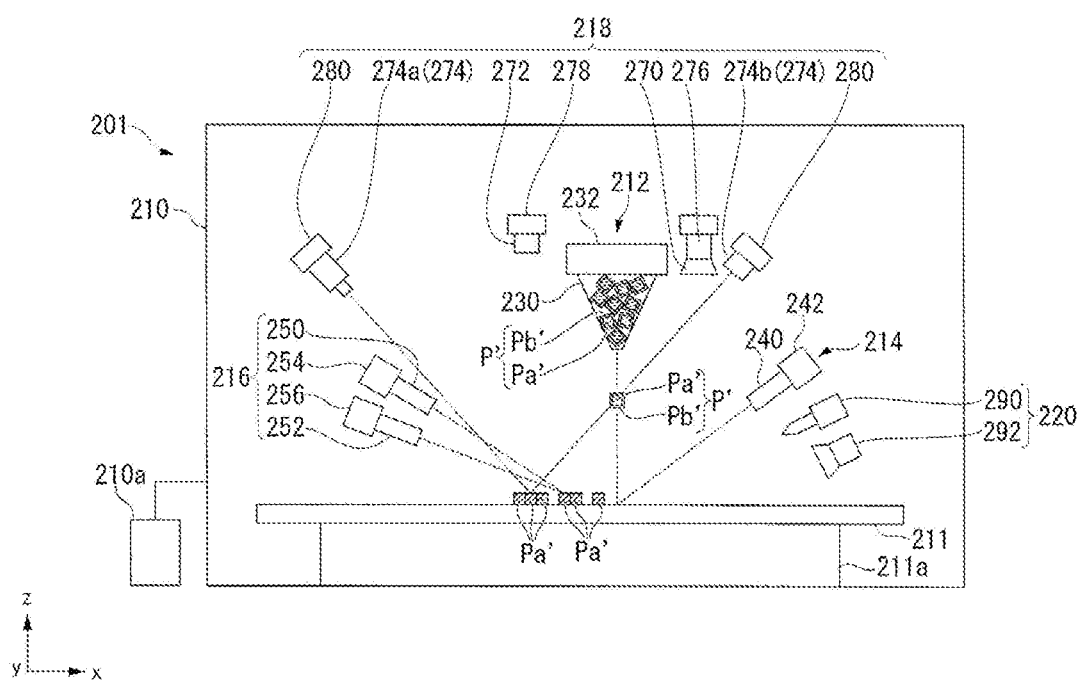
FIG. 8 is a schematic front diagram showing a forming apparatus according to a third embodiment.
Figure 9:
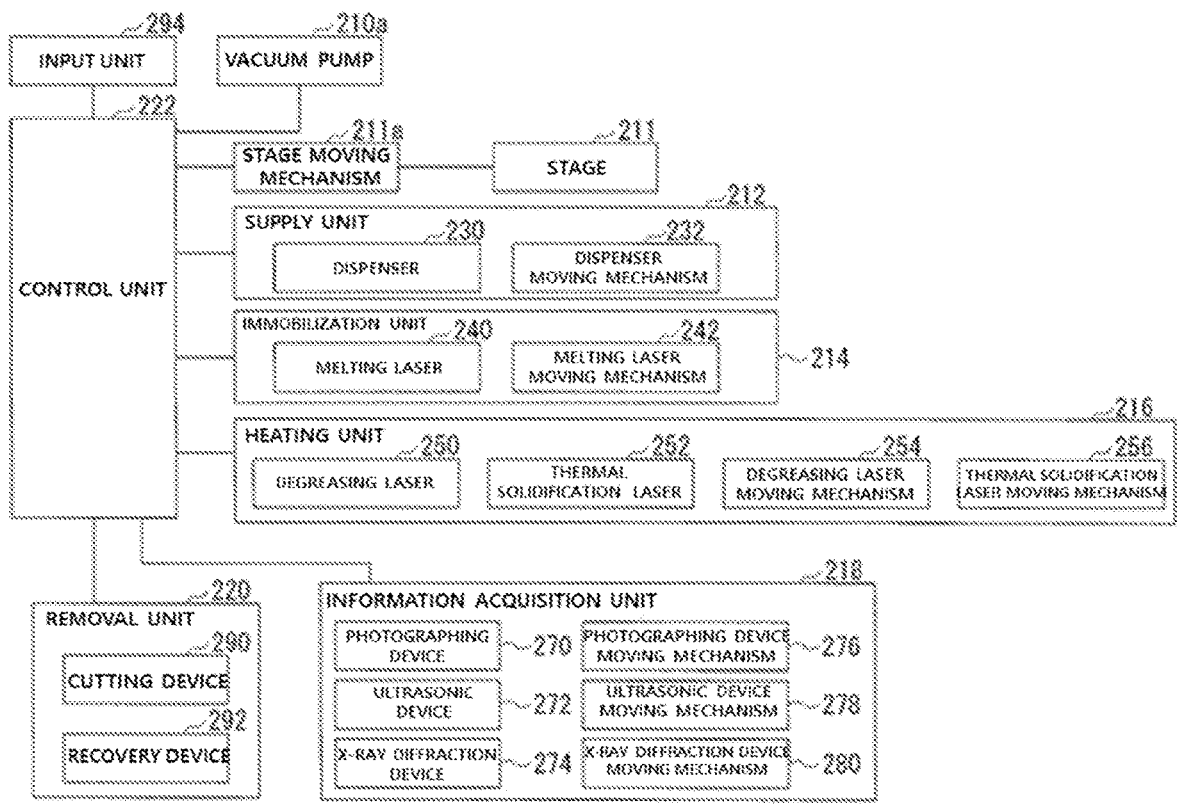
FIG. 9 is a block diagram showing an example of a system configuration of the forming apparatus of the third embodiment.

FIG. 8 is a diagram showing a forming apparatus 201 according to the third embodiment. FIG. 9 is a block diagram showing an example of a system configuration of the forming apparatus 201 of the third embodiment.

In the third embodiment, the composition (P') has a core-shell structure containing the inorganic particle (Pa') (core) and the organic coating (Pb') (shell) which coats the inorganic particle (Pa'). The composition (P') is a solid and a large number of the compositions (P') fill a dispenser 230. For example, the dispenser 230 discharges the composition (P') by one drop onto a stage 211.

The organic coating (Pb') is made of thermoplastic resin or the like, which is softened or melted (hereinafter, collectively and simply referred to as 'melted') by heat. Examples of the thermoplastic resin can include polyethylene, polypropylene, polystyrene, polyamide, polycarbonate, polyacetal, polyethylene terephthalate, vinyl chloride resin, ABS resin (acrylonitrile-butadien-styrene copolymer synthetic resin), and the like.

As shown in FIG. 8, the forming apparatus 201 according to the third embodiment includes a chamber 210, the stage 211, a supply unit 212, the immobilization unit 214, a heating unit 216, an information acquisition unit 218, a removal unit 220, and a control unit 222 (see FIG. 9).

While the immobilization units 14 and 114 of the first and second embodiments include the LEDs 40, 140 and 142 for curing the binder (Pb), the immobilization unit 214 includes the melting laser 240.

The melting laser 240 applies heat to the organic coating (Pb') on the stage 211. As a result, the organic coating (Pb') is melted on the stage 211. For example, the melting laser 240 can perform laser irradiation to the composition (P') to heat the composition (P') to a temperature of, for example, 80° C. to 200° C., thereby melting the organic coating (Pb') of the composition (P'). The melting laser 240 is movable at least in the x-direction and the y-direction by a melting laser moving mechanism 242, and is rotatable, for example, around the z axis, and is rotatable even in the plane parallel to the z axis.

Next, an example of a method of producing a formed body by the forming apparatus 201 of the third embodiment will be described with reference to FIGS. 10 and 11.

FIGS. 10A to 10G depict steps of the method of producing a formed body by the forming apparatus 201 of the third embodiment. FIGS. 10A to 10G depict a series of processes from the discharge to the thermal solidification of the composition (P') in the production method.

In FIG. 10A, the composition (P') is discharged from the dispenser 230 toward the stage 211. Here, as in FIG. 3, a thermally solidified body (C') in which the thermal solidification has been already completed, and inorganic particles (Da' to Dd'), surrounded by a solidified coating (B') solidi-fied after the melting of the organic coating (Pb'), have been formed on the stage 211. The discharge of the composition (P') is performed in order from the left side (−x direction) to the right side (+x direction) of the figure.

In FIG. 10B, the discharged composition (P') lands beside the inorganic particle (Dd'). The information acquisition unit 218 acquires the landing position and timing of the composition (P'). Immediately after landing, the discharged composition (P') is a solid, and the organic coating (Pb') of the composition (P') is not integrated with the adjacent solidified coating (B'). Toward this organic coating (Pb'), the melting laser 240 in the immobilization unit 214 irradiates laser beam. As a result, the organic coating (Pb') made of thermoplastic resin is melted.

In FIG. 10O, the organic coating (B') near the inorganic particle (Dd') adjacent to the organic coating (Pb') is also melted by the melting laser 240 simultaneously together with the organic coating (Pb') to be integrated with the organic coating (Pb'). Next, the melted organic coating (Pb') is solidified by natural cooling. At this time, since the simultaneously melted organic coating (B') is also solidified, the entire organic coatings surrounding the inorganic particles (Da' to De') are integrated.

In FIG. 10D, the organic coating (B') containing the organic coating (Pb') is solidified, and the inorganic particle (De') contained in the discharged composition (P') is immobilized on the stage 211.

The subsequent processes shown in FIGS. 10D to 10G are substantially the same as the processes shown in FIGS. 3C to 3F. That is, in FIG. 10D, a degreasing laser 250 of the heating unit 216 irradiates laser beam near the inorganic particle (Da'), such that the solidified coating (B') near the inorganic particle (Da') is degreased. In FIG. 10E, a thermal solidification laser 252 of the heating unit 216 irradiates laser beam near the boundary between the thermally solidified body (C') and the inorganic particle (Da'), thereby thermally solidifying the thermally solidified body (C') and the inorganic particle (Da'). In FIG. 10F, the dispenser 230 or the like moves in the +x-direction. In FIG. 10G, the composition (P') is discharged again from the dispenser 230 toward the stage 211. Thereafter, the operations described with reference to FIGS. 10B to 10F are repeated.

Figure 11:
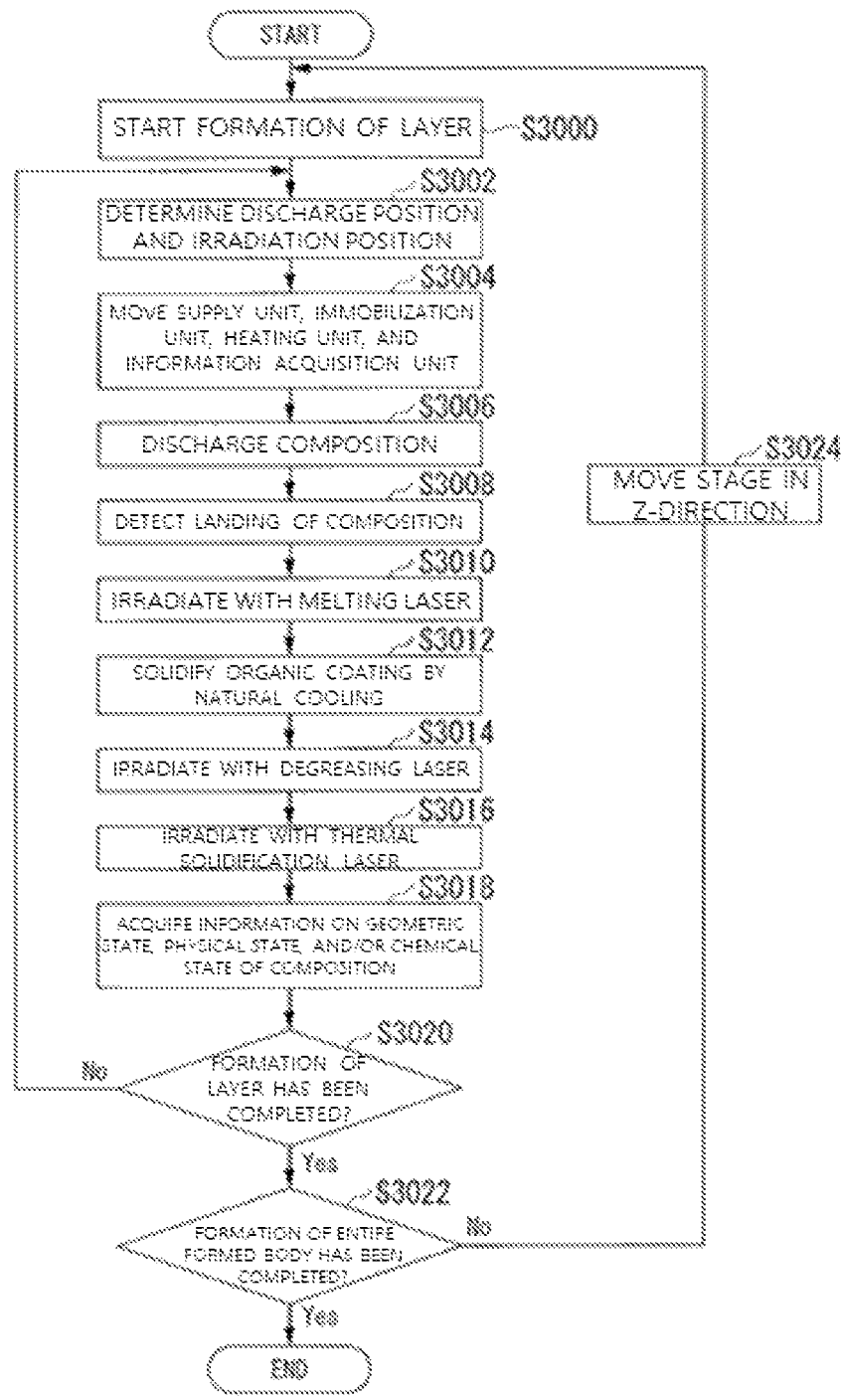
FIG. 11 is a flowchart showing an example of the method of producing a formed body by the forming apparatus of the third embodiment.

FIG. 11 is a flowchart showing an example of the method of producing a formed body by the forming apparatus 201 of the third embodiment.

The process of immobilizing the composition on the stage in the method is different from that of the method of producing a formed body by the forming apparatus 1 shown in FIG. 4.

In the first embodiment, the immobilizing of the composition (P) is executed by curing the binder (Pb) with the LED 40 after the landing of the composition (P) is detected (S1006).

In comparison, in the third embodiment, after the landing of the composition (P') is detected, the control unit 222 directs the melting laser 240 to irradiate laser beam to the composition (P') for heating and melting the organic coating (Pb') of the composition (P') which has landed on the stage 211 (S3010). Thereafter, the melted organic coating (Pb') is solidified by natural cooling (S3012). As a result, the composition (P') is immobilized on the stage 211.

The state or temperature of the organic coating (Pb') can be inspected by a photographing device 270 of the information acquisition unit 218 or any detector (for example, a thermography device), thereby determining whether the organic coating (Pb') has been solidified. Alternatively, it can be determined that the organic coating (Pb') has been solidified when the melting laser 240 had irradiated laser beam and a predetermined time had elapsed. If it is determined that the organic coating (Pb') has been solidified, the flow proceeds to S3014.

The subsequent processes are the same as those of the first embodiment. That is, S3014, S3016, S3018, S3020, S3022 and S3024 of FIG. 11 correspond to the S1012, S1014, S1016, S1018, S1020 and S1022 of FIG. 4.

Further, the composition (P') of the third embodiment can be used in the second embodiment. For example, one side or both sides of the first composition (P1) and the second composition (P2) of the second embodiment can have the same form as the composition (P') of the third embodiment.

[Modifications]

In the above example, after the discharge, immobilization, degreasing, and thermal solidification of the composition are completed, the stage moves in the x-direction or the y-direction to discharge the next composition, but the forming process is not limited thereto. For example, after the immobilization of the composition, the stage can be moved before the degreasing, and the discharge or immobilization of the next composition can be performed at the same time as the degreasing or the thermal solidification. Further, the discharge of the next composition can be performed at the same time as the immobilization of the composition. For example, if the discharge of the composition from the dispenser is performed continuously rather than intermittently, the composition is supplied continuously, such that the immobilization, degreasing, and thermal solidification of the supplied composition, and the movement of each component such as the stage or the laser can be performed at the same time as the supply of the composition.

In the above example, after the composition lands on the stage, light irradiation for immobilization by the LED or the melting laser is performed, but the timing of the immobilization process is not limited thereto. For example, light irradiation can be performed while the composition is discharged and falls.

In the above example, the degreasing laser and the thermal solidification laser irradiate laser beam to substantially the same region, but the irradiation positions thereof cannot be necessarily the same. For example, the irradiation position of the thermal solidification laser can be spaced at a certain distance (for example, about 1 mm) apart from the irradiation position of the degreasing laser, and the irradiation of the thermal solidification laser can be controlled to follow the irradiation of the degreasing laser.

In the above example, the operation of the forming apparatus can be stabilized by temporarily immobilizing the composition on the stage by using the LED or the melting laser before the degreasing, but for example, this immobilization can be omitted, and if the landing of the composition on the stage is detected, the degreasing of the binder can be performed by irradiating laser beam with the degreasing laser.

In the above example, the immobilization unit and the heating unit are installed as separate components, but for example, as a light source for curing the photocurable composition of the composition, the degreasing laser or the thermal solidification laser of the heating unit can also be used. In this case, when the immobilization is performed, a decreased output of the laser can be used, and when the degreasing and the thermal solidification are performed, an increased output of the laser can be used. As a result, the configuration of the forming apparatus can be simplified.

In the above example, after the thermally solidifying is executed and before the landing of the composition is detected, the discharge position of the dispenser and the irradiation positions of the immobilization unit and the heating unit can be determined by the control unit, and the arrangement thereof can be changed, but the timing of determination of these discharge and irradiation positions and the change in arrangement thereof are not limited thereto. The control unit can determine the discharge position of the dispenser and the irradiation positions of the immobilization unit and the heating unit at any timing, and can direct the dispenser moving mechanism, the LED moving mechanism, the degreasing laser moving mechanism, and the thermal solidification laser moving mechanism to change the arrangement thereof at any timing.

In the above example, the discharge position and the irradiation position are determined based on the information acquired by the information acquisition unit, but the discharge of the composition and each step can be executed according to a sequence of predetermined discharge position and irradiation position without using such information. Likewise, in the above example, the irradiation timing of the immobilization unit or the heating unit is determined based on the information acquired by the information acquisition unit, but the irradiation timing of the immobilization unit or the heating unit can also be determined based on the timing at which the dispenser actually discharges the composition, the density of the composition, the amount of composition discharged, the distance between the dispenser and the stage, or the like without using such information.

In the above example, although the process of forming the layers of the formed body one by one from below by descending the stage step by step in the z-direction has been described, the forming process is not necessarily performed by the layer. For example, the formed body can be formed by appropriately changing the heights or directions of the dispenser, the immobilization unit, and the heating unit to deposit the composition on the stage without moving the stage in the z-direction. In this case, the dispenser, the immobilization unit, and the heating unit can be movable in the z-direction by the dispenser moving mechanism, the LED moving mechanism, the degreasing laser moving mechanism, and the thermal solidification laser moving mechanism.

Further, in the above example, the dispenser, the immobilization unit, and the heating unit are moved based on the determined discharge position and irradiation position, but the stage can be moved in the x-direction and the y-direction instead of moving the dispenser, the immobilization unit, and the heating unit. That is, the positions of the dispenser, the immobilization unit, and the heating unit can be fixed, and the stage can be moved in the x-direction, the y-direction, and the z-direction. Alternatively, the stage, the dispenser, the immobilization unit, and the heating unit can be all movable in the x-direction and the y-direction.

In the above example, the dispenser is used as the supplier for supplying the composition, but the supplier is not limited thereto. For example, if the composition is a solid having a certain size or more, a fine arm mechanism which can be disposed at any place on the stage while maintaining the composition with adsorption by physical gripping, magnetic action, or the like can be used as the supplier.

As described above, although the present disclosure has been described with reference to the limited embodiments and drawings, the present disclosure is not limited thereto, and it is natural that various modifications and variations can be made by those skilled in the art to which the present disclosure pertains within the technical spirit of the present disclosure and the equivalent scope of the claims.

The invention claimed is:

1. A forming apparatus for forming a three-dimensional formed body, comprising:
   a stage;
   a supply unit configured to intermittently or continuously supply a composition comprising an inorganic material to the stage, the composition comprising an organic binder in which the inorganic material has been dispersed or an organic coating surrounding the inorganic material;
   a heating unit comprising a thermal solidification laser and a degreasing laser, the thermal solidification laser and the degreasing laser each being spaced apart from the stage and each being disposed above the stage, the thermal solidification laser configured to perform at least thermal solidification of the composition on the stage, the degreasing laser configured to degrease the organic binder or the organic coating by applying heat to the composition, the degreasing laser being different than the thermal solidification laser, the heating unit comprising a thermal solidification laser moving mechanism configured to move the thermal solidification laser relative to the stage at least in two orthogonal horizontal directions, and a degreasing laser moving mechanism configured to move the degreasing laser relative to the stage at least in the two orthogonal horizontal directions;
   an information acquisition unit configured to acquire information on the geometric state of the thermally solidified composition, the information acquisition unit comprising a photographing device configured to photograph the thermally solidified composition on the stage, the information acquisition unit configured to acquire the information on the geometric state of the thermally solidified composition based on photographed data obtained from the photographing device, the information on the geometric state of the thermally solidified composition including locations of cracks or pores;
   a removal unit configured to remove at least a portion of the thermally solidified composition from the stage; and
   a control unit configured to control the supply unit and the heating unit to repeat supply and thermal solidification of the composition, and to control the supply unit and the heating unit based on the acquired information, the control unit configured to control a position of the supply unit and a position of the heating unit relative to the stage based on the information on the geometric state of the thermally solidified composition, the control unit configured to control the degreasing laser to perform the degreasing,
   wherein the control unit is configured to control the removal unit to remove the at least a portion of the thermally solidified composition on the stage to suppress the cracks or pores, based on the information on the geometric state of the thermally solidified composition,
   wherein the control unit controls the supply unit and the heating unit to repeat supply and thermal solidification of the composition at least along a surface of the stage based on the acquired information, to re-fill a removed portion of the thermally solidified composition.

2. The forming apparatus of claim 1,
   wherein the control unit controls a position of the supply unit and a position of the heating unit relative to the stage, based on the acquired information.

3. The forming apparatus of claim 1,
   wherein the supply unit comprises:
   a first supplier configured to intermittently or continuously supply a first composition to the stage, wherein the first composition comprising a first inorganic material; and
   a second supplier configured to intermittently or continuously supply a second composition to the stage, wherein the second composition comprising a second inorganic material different from the first inorganic material.

4. The apparatus of claim 3,
   wherein the heating unit comprises:
   a first thermal solidification heat source configured to perform at least thermal solidification of the first composition on the stage; and
   a second thermal solidification heat source configured to perform at least thermal solidification of the second composition on the stage.

5. The forming apparatus of claim 1, further comprising an immobilization unit configured to immobilize the composition on the stage.

6. The forming apparatus of claim 5,
   wherein the composition comprises an organic binder comprising a photocurable composition or comprises an inorganic particle coated with an organic coating, and
   wherein the immobilization unit comprises a light source configured to photocure the photocurable composition before thermal solidification of the composition by the heating unit or comprises a melting heat source configured to thermally melt the organic coating before thermal solidification of the composition by the heating unit.

* * * * *